United States Patent [19]
Kuriki et al.

[11] Patent Number: 5,317,405
[45] Date of Patent: May 31, 1994

[54] DISPLAY AND IMAGE CAPTURE APPARATUS WHICH ENABLES EYE CONTACT

[75] Inventors: Makoto Kuriki, Tokyo; Hitoshi Arai, Niiza; Shigenobu Sakai, Tama; Masato Nakamura, Hachioji; Hideki Nakajima; Shirou Suyama, both of Tokyo; Kazutake Uehira; Noboru Hagiwara, both of Tokorozawa, all of Japan

[73] Assignee: Nippon Telegraph and Telephone Corporation, Tokyo, Japan

[21] Appl. No.: 840,559

[22] Filed: Feb. 25, 1992

[30] Foreign Application Priority Data

| Mar. 8, 1991 | [JP] | Japan | 3-67588 |
| Apr. 15, 1991 | [JP] | Japan | 3-108161 |
| Jul. 22, 1991 | [JP] | Japan | 3-204530 |
| Jul. 22, 1991 | [JP] | Japan | 3-204531 |
| Aug. 26, 1991 | [JP] | Japan | 3-236825 |

[51] Int. Cl.$^5$ .................. H04N 5/30; H04N 7/14
[52] U.S. Cl. .................. 348/20; 359/850; 359/618
[58] Field of Search .................. 358/209, 85, 234, 237, 358/225; 379/53; 359/601, 602, 603, 609, 614, 850, 851, 741, 842, 619, 627, 628, 638, 618, 625, 629; H04N 7/14

[56] References Cited

U.S. PATENT DOCUMENTS

| 2,499,453 | 3/1950 | Bonnet | 359/625 |
| 3,501,587 | 3/1970 | Herriott et al. | 178/6.7 |
| 4,315,671 | 2/1982 | Bunch | 359/741 |
| 4,436,398 | 3/1984 | Endo et al. | 359/629 |
| 4,756,603 | 7/1988 | Ohtani | 359/601 |
| 4,928,301 | 5/1990 | Smoot | 379/53 |
| 5,117,285 | 5/1992 | Nelson et al. | 358/225 |

FOREIGN PATENT DOCUMENTS

| 2037890 | 2/1990 | Japan | H04N 7/14 |
| 4081090 | 3/1992 | Japan | H04N 7/14 |
| 4145789 | 5/1992 | Japan | H04N 7/14 |
| 4150684 | 5/1992 | Japan | H04N 7/14 |
| 4154289 | 5/1992 | Japan | H04N 7/14 |

OTHER PUBLICATIONS

"Image Pickup Device for Bidirectional Picture Communication Displaying System"; Pat. Abst. of Japan, vol. 14, No. 190, Apr. 18, 1990.
"Video Telephone System"; Patent Abstracts of Japan, vol. 14, No. 151, Mar. 22, 1990.
"Image Display Device with Image Pickup Device", Patent Abstr. of Japan, vol. 12, No. 151, May 11, 1988.
"Fresnel Mirror"; Patent Abstracts of Japan, vol. 15, No. 483, Dec. 6, 1991.
"Bildtelefon mit Direktem Blickkontakr", by A. Bersch, Nachrichten Elektronik und Telematik, vol. 41, No. 6, Jun. 1987, pp. 235-237.

*Primary Examiner*—Joseph Mancuso
*Assistant Examiner*—Wendy R. Greening
*Attorney, Agent, or Firm*—Pollock, Vande Sande and Priddy

[57] ABSTRACT

In a display and image capture apparatus for a videophone or video teleconferencing system a half-transparent mirror array is disposed adjacent the display surface of a display and an image reflected by the half-transparent mirror array is captured by a video camera. The half-transparent mirror array is formed by a plurality of micro HMs arranged in the same plane at a predetermined inclination angle and reflects incident light from a subject toward the video camera.

13 Claims, 15 Drawing Sheets

DISPLAY AND IMAGE CAPTURE APPARATUS WHICH ENABLES EYE CONTACT

BACKGROUND OF THE INVENTION

The present invention relates to a display and image capture apparatus which enables eye contact between callers in a videophone, video teleconferencing or similar system.

With recent developments of telecommunication technology such as video coding techniques, a two-way visual telecommunication system which links remote places through a video and audio communication network, such as a videophone or video teleconferencing system, has rapidly come into wide use. It is now being expected that the two-way visual telecommunication will be able to offer images full of a sense of reality by the expansion of an integrated services digital network (ISDN) and broadening of the band of the transmission network therefor. FIG. 1 shows a display and image capture apparatus which is now employed in the two-way visual telecommunication. A video camera 3 is mounted on the top or one side of a CRT display or like display 1, the image of a user M captured by the video camera 1 is transmitted to a similar display and image capture apparatus (not shown) at a remote place and displayed on its display. In this instance, however, the user M of such an apparatus is usually looking at the display 1 on which the person he is talking to is being displayed, and hence he will not turn his gaze on the video camera 3. This results in a boring conversation between callers who do not look each other in the eyes, although their images can be transmitted with a sense of reality.

Methods which employ a half-transparent mirror (which may be referred to simply as HM) for enabling eye contact between callers are proposed in Japanese Patent Application Laid Open Nos. 269128/87 and 11082/90, for example. FIG. 2 shows the basic configuration for such methods. A half-transparent mirror 2 is disposed in front of the display 1. An image from a subject, i.e. the image of the user M is reflected by the half-transparent mirror 2 and is captured by the video camera 3 disposed above the half-transparent mirror 2. Consequently, the image thus captured is equivalent to an image which is captured from the position of the display 1, and since the user's (i.e. talker's) eye is being directed toward the display 1, the eyes of the talker M and the listener being displayed on the display screen will meet. With such a configuration as depicted in FIG. 2, however, the size of the half-transparent mirror 2 increases with an increase in the size of the display screen of the display 1. This will also increase the depth D of the display and image capture apparatus, resulting in the apparatus inevitably becoming bulky.

In Japanese Patent Public Application Laid open No. 37890/90 there is proposed, as another method for enabling eye contact between callers, a configuration in which a mirror or half-transparent mirror having a number of parallel slits cut therein is disposed aslant in the same fashion as in the case of FIG. 2, in place of using the continuous half-transparent mirror. This is also defective in that the overall depth of a combined structure of the mirror and the display is large as is the case with the prior art example of FIG. 2. In this laid open application it is further stated that the depth is reduced by dividing the slit mirror into two and disposing them vertically, but in this case, since light reflected by the lower slit mirror enters the video camera through the upper slit mirror, a double image is captured; hence, this structure is impractical. In Japanese Patent Application Laid Open No. 209403/91 there is disclosed, with a view to reducing the depth of a projection TV set, a configuration wherein light from a projector provided at the lower part in the set is projected to a Fresnel mirror mounted on the ceiling of the set and the reflected light from the Fresnel mirror is projected onto the back of a screen mounted on the front of the set. Yet, this laid open patent application makes no mention of capturing the image of a person looking at the image on the TV display from the direction to meet his eye, and even if the Fresnel mirror replaces the aforementioned half-transparent mirror 2 in FIG. 1, the user M cannot see his image displayed on the display, because the Fresnel mirror is not half-transparent.

Thus, the conventional display and image capture apparatuses possess the shortcomings that no eye contact is enabled between callers or the apparatuses which enable eye contact are bulky.

SUMMARY OF THE INVENTION

It is therefore an object of the present invention to provide a display and image capture apparatus which is small in size and enables eye contact between callers.

The display and image capture apparatus according to the present invention includes: a display having a display surface; half-transparent mirror means composed of a plurality of micro HMs arranged in a plane adjacent the display surface; and image capture means whereby the image of a subject in front of the half-transparent mirror is captured as an image reflected from the half-transparent mirror. The micro HMs of the half-transparent mirror means are each inclined at a predetermined angle so that a portion of light incident thereto from the direction of the center axis of the display surface is reflected at an acute angle thereto.

With such a construction, the user is allowed to see the image on the display through the half-transparent mirror and the video camera is capable of capturing the reflected image from the half-transparent mirror means as the image of the user viewed from the position of the display. Consequently, the eye of the thus image-captured user and the eye of the person displayed on the display will meet. Moreover, the depth of the entire apparatus can be reduced by a suitable selection of the angle of reflection by the half-transparent mirror means to the center axis of the display surface.

DESCRIPTION OF THE PREFERRED EMBODIMENT

Figure 1:
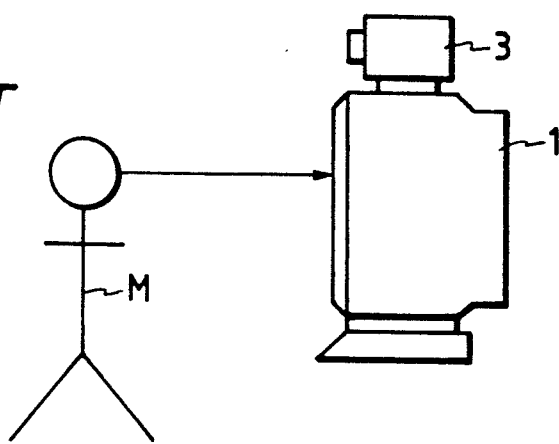
FIG. 1 is a side view showing the configuration of a conventional display and image capture apparatus which cannot enable eye contact.
Figure 2:
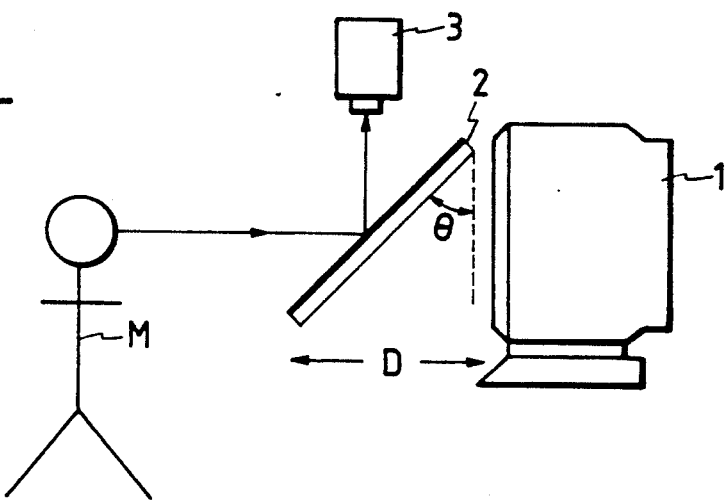
FIG. 2 is a side view showing the configuration of a conventional display and image capture apparatus which enables eye contact.
Figure 3:
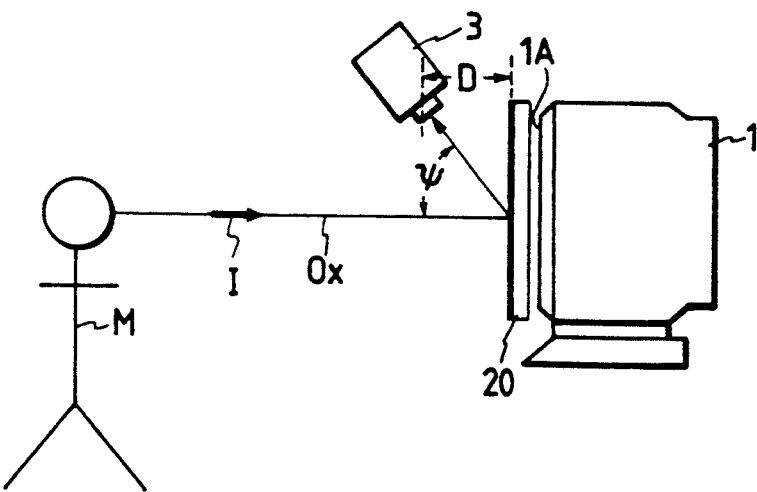
FIG. 3 is a side view showing the basic configuration of an embodiment of the display and image capture apparatus according to the present invention.

FIG. 3 illustrates an embodiment of the display and image capture apparatus according to the present invention. A substantially rectangular half-transparent mirror array 20 is disposed adjacent the front of a display surface 1A of the display 1. The video camera 3 is disposed at a position diagonally above the front of the half-transparent mirror array 20, outside the visual angle of the user M to the display surface 1A, the video camera 3 being directed substantially to the center of the half-transparent mirror array 20. As described later, the half-transparent mirror array 20 is formed by a plurality of micro HMs arranged in the same plane with each of their mirror surfaces directed to a predetermined position. Incident light I from the subject M, parallel to an optical axis Ox perpendicular to the half-transparent mirror array 20, is reflected by the mirror array 20 to the direction of a certain reflection angle $\psi$ and the reflected image is captured by the video camera 3. Thus the video camera 3 is capable of capturing the image of the talker M from the direction which coincides with the talker's eye. Since the half-transparent mirror array 20 can be disposed in parallel to the display surface 1A of the display 1 unlike in the prior art example of FIG. 2, the depth D can be appreciably reduced as compared with that in the case of FIG. 2 and the apparatus can be reduced in size accordingly. By setting the direction of reflection of light as desired by suitably selecting the azimuth of the reflecting surface of each micro HM forming the half-transparent mirror array 20, the video camera 3 can be disposed below or on the right or left side of the display 1. The half-transparent mirror array 20 need not always be disposed in parallel to the display surface 1A but may also be tilted at a small angle to some extent. Moreover, as will be described later in respect of other embodiments (FIGS. 11 and 13), it is also possible to employ a configuration in which a reflecting mirror is placed at the position of the video camera 3 in FIG. 3 and the video camera 3 is mounted on the display 1 or disposed beside or under the display 1.

Figure 4:
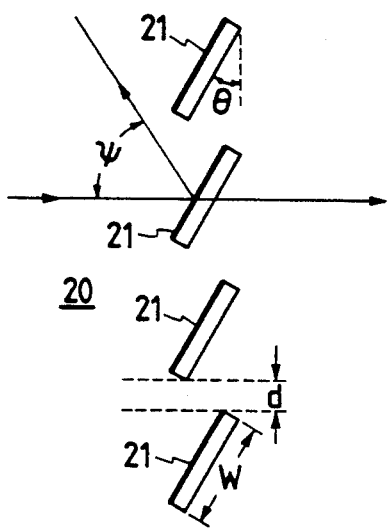
FIG. 4 is an enlarged side view showing an example of a half-transparent mirror array 20 for use in the embodiment of FIG. 3.

FIG. 4 illustrates in section an embodiment of the half-transparent mirror array 20 for use in the display and image capture apparatus according to the present invention depicted in FIG. 3. The half-transparent mirror array 20 is formed by a plurality of strip-like micro HMs 21 which have a length substantially equal to or larger than the width of the display surface 1A and are arranged in parallel in the same plane with spacings d so that they extend horizontally. The angle $\theta$ in FIG. 4 is the angle of inclination of each micro HM (i.e. the inclination of its mirror surface). With such a structure, a portion of incident light in the direction of the optical axis Ox is reflected to a direction of the angle $\psi=2\theta$ as shown. The width W of each micro HM 21 can be selected to be about the same size as a picture element. The micro HMs are not limited specifically to strip-like shapes but may also be square and ring-shaped one as will be referred to later one and they may also be arranged in a matrix or concentric form.

Figure 5:
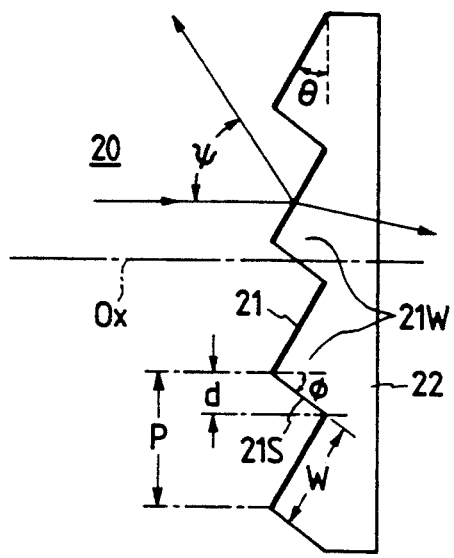
FIG. 5 is an enlarged side view showing another example of the half-transparent mirror array 20 for use in the FIG. 3 embodiment.

FIG. 5 illustrates another embodiment of the half-transparent mirror array 20 for use in the present invention. In this embodiment the half-transparent mirror array 20 is produced by machining or molding one surface of a transparent substrate 22 as of glass or synthetic resin so that ridges 21W each having a slope of the inclination angle $\theta$ and the width W are arranged in parallel over the entire area of the substrate surface, followed by coating the micro HMs 21 on the slopes of the ridges 21W to form the plurality of strip-like micro HMs 21 as a unitary structure with one another. The side wall surface 21S of each ridge 21W is inclined at an angle $\phi$ to the optical axis Ox to define the spacing d which is determined by d=$W\sin\theta\tan\phi$. In this embodiment no micro HM is formed on the side wall surface 21S. The pitch P of the ridges 21W on which the micro HMs 21 are formed may preferably be small, from the viewpoint of averaging the influence on the image displayed on the display screen 1A; for example, the pitch P is selected in the range of 0.1 to 2 mm when the diagonal of the display surface 1A is about 10 inches. The width W and/or spacing d of the micro HMs 21 need not always be held constant and at least one of them may preferably be varied randomly so as to prevent the formation of moire fringes by the interaction with the pixel arrangement on the display surface 1A. The half-transparent mirror array 20 having the micro HMs 21 formed as a unitary structure, as mentioned above, eliminates the necessity of positioning the individual micro HMs 21 unlike in the FIG. 4 embodiment, and hence it is easy to fabricate.

As is evident from FIG. 5, if the angle $\theta$ is 45 degrees, the angle $\psi$ is 90 degrees and the light reflected by each micro HM 21 reflected light upwardly. That is, the reflected light strikes against the adjoining micro HM 21 and does not reach the video camera 3. Hence, at least the angle $\theta$ needs to be less than 45 degrees. On the other hand, in the case where the video camera 3 in the FIG. 3 embodiment (or a mirror 10 or 11 in FIG. 11 or 13) is disposed outside but adjacent an area onto which the area of the display surface 1A is projected forwardly in parallel thereto and the optical axis of the video camera 3 is directed toward substantially the center of the display surface 1A, the distance D from the half-transparent mirror array 20 to the video camera 3 (or the mirror 10 or 11) is expressed by D=$H\tan(90°-2\theta)/2$, where H is the height of the display surface 1A. Accordingly, the depth D can be made smaller than in the case of FIG. 2, by selecting the inclination angle $\theta$ of the micro HM in FIGS. 4 and 5 to be larger than 13 degrees.

Figure 5A:
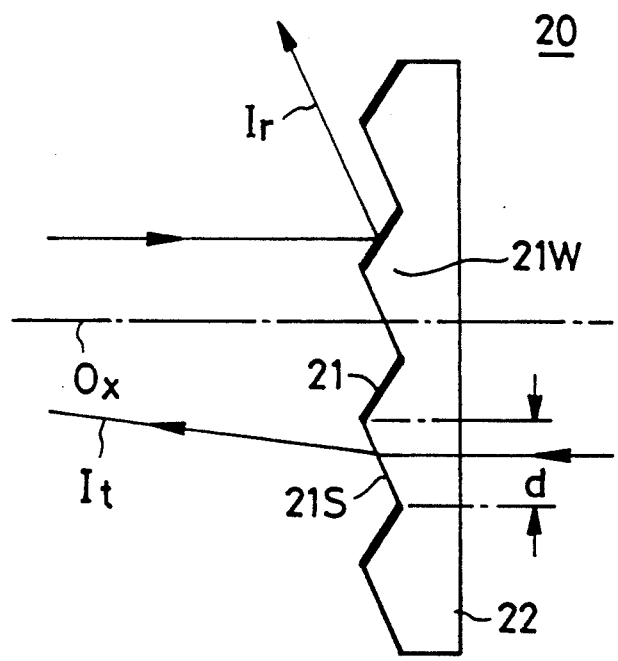
FIG. 5A shows a half-transparent mirror array which is similar to that of FIG. 5, but in which the micro HMs substantially do not transmit light.

In the case where such a half-transparent mirror array 20 as depicted in FIG. 5 is placed in front of the display surface 1A in FIG. 3, the caller M can see the displayed image on the display surface 1A through the micro HMs 21 of the half-transparent mirror array 20 and the intermediate portions separating them at intervals d, whereas the image of the caller M can be captured by the reflected light from the micro HMs 21. By raising the reflectivity of the micro HM 21 to increase the brightness of the image captured by-the video camera 3, the brightness on the display surface 1A viewed from the caller M decreases, but by increasing the spacing d, the quantity of light reaching the caller M through the intermediate portions d from the display surface 1A increases, enhancing the brightness on the display surface 1A. That is, even when the transmissivity of each micro HM 21 is so small, e.g., less than 10%, that it can be regarded as acting as a mere reflector, it is possible, by selecting an appropriate interval d, for the caller M to observe an image on the display surface 1A through the half-transparent mirror array as indicated by light ray It in FIG. 5A passing between micro HMs 21, while an image of the caller M can be provided to the video camera 3 as indicated by light ray Ir reflected by the micro HM 21. Thus, as long as the half-transparent mirror array 20, in its entirety, can provide sufficient amounts of reflected light and transmitted light, the transmissivity of each micro HM 21 can be so small that the transmitted light through micro HMs 21 is substantially imperceptible to the human eyes. The same is true of the half-transparent mirror array 20 shown in FIG. 4. Incidentally, the half-transparent mirror array 20 in FIG. 5 is shown to be disposed in front of the display surface 1A with the micro HMs 21 facing toward the caller M, but they may also face toward the display surface 1A.

Figure 6A:
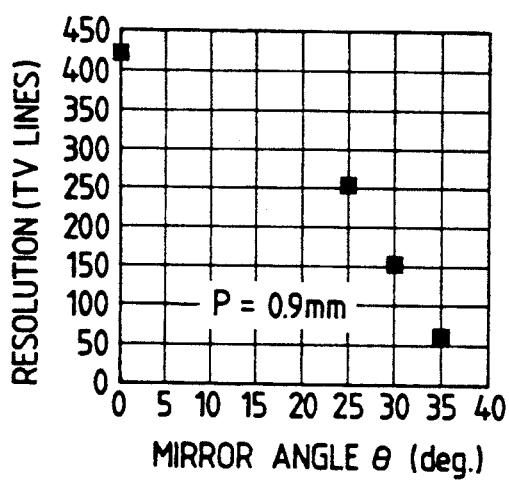
FIG. 6A is a graph showing the relationship between the resolution of a reflected image and the angle of inclination of a micro HM in the case of employing the half-transparent mirror array 20 depicted in FIG. 5.

FIG. 6A shows the relationship between the resolution of a reflected image and the inclination angle θ of the micro 21 when the half-transparent mirror array 20 of the FIG. 5 embodiment was used. The pitch P of the micro HMs 21 was 0.9 mm. The resolution was evaluated in terms of horizontal resolution of the reflected image captured by the video camera 3. The resolution in the case of the angle θ=0 is the resolution of an image captured directly by the camera. As will be seen from the graph, the resolution lowered with an increase in the angle θ, and when the angle was 40 degrees, the image quality was impaired so badly that it could not be evaluated. It is therefore desirable, in the half-transparent mirror arrays 20 of such structures as depicted in FIGS. 4 and 5, that the angle θ be smaller than 40 degrees in practice.

Figure 6B:
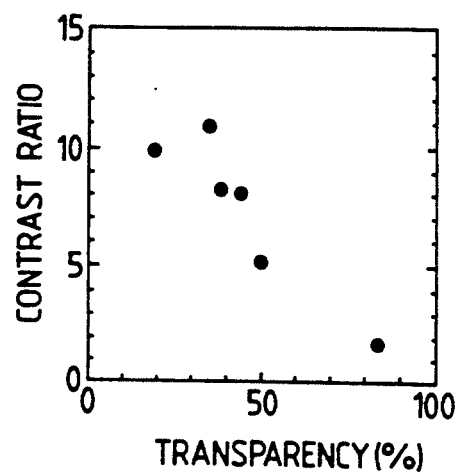
FIG. 6B is a graph showing measured results of the transparency of the half-transparent mirror array 20 depicted in FIG. 5 and the contrast ratio of the reflected image.

FIG. 6B shows the relationship between the transparency of light through the half-transparent mirror array 20 of FIG. 5 and the contrast ratio of a reflected image from the mirror array. Six half-transparent mirror arrays 20 of different transparencies were each produced by forming the ridges 21W each having a slope of the inclination angle θ=25° at the pitch P=0.9 mm all over the surface of the transparent substrate 22 made of acrylic resin and then vapor-depositing a metallic film on the slopes. The sample of 80% transparency had no metallic film. The contrast ratio was obtained in the following manner. In the configuration shown in FIG. 3 a liquid crystal display was used as the display 1, an image of a monochrome test pattern reflected by each half-transparent mirror array 20 was captured by the video camera 30, the thus captured image was displayed on the liquid crystal display 1 and the brightness of each of black and white areas of the monochrome test pattern thus displayed was measured through the half-transparent mirror array 20, whereby the contrast ratio was evaluated. As shown in FIG. 6B, when the transparency is above 50%, the contrast ratio is below 5 and the image quality of the displayed image is impaired. Hence it is preferable that the transparency of the half-transparent mirror array 20 be below 50%.

Figure 7A:
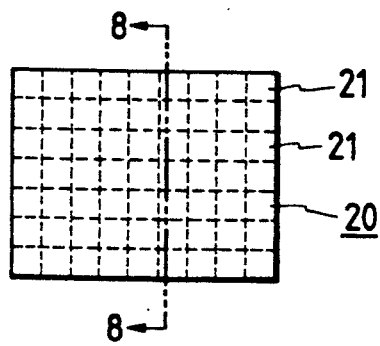
FIG. 7A is a diagram schematically showing a matrix arrangement of micro HMs.
Figure 7B:
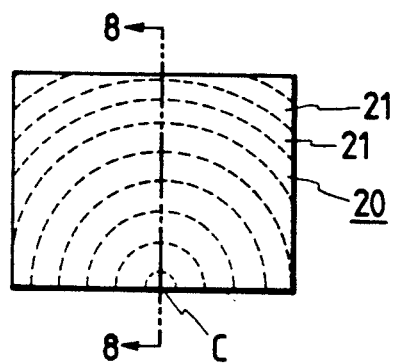
FIG. 7B is a diagram schematically showing a concentric arrangement of micro HMs.

FIGS. 7A and 7B each show an example of the arrangement of the micro HMs 21 of the half-transparent mirror array 20 for use in the apparatus depicted in FIG. 3. In the case of FIG. 7A rectangular micro HMs 21 are arranged in a matrix form to form the half-transparent mirror array 20, and in this instance, by irregularly varying the pitch of the arrangement of the micro HMs 21 and/or their sizes, it is possible to prevent the formation of moire fringes which would otherwise be caused by the interaction between the arrangement of the micro HMs 21 and the pixel arrangement of the display 1. In the case of FIG. 7B arc-shaped micro HMs 21 each have a surface inclined with respect to the center C common to them and a number of such micro HMs 21 of different radii are arranged concentrically to form the surface configuration of what is called a Fresnel lens.

Figure 8A:
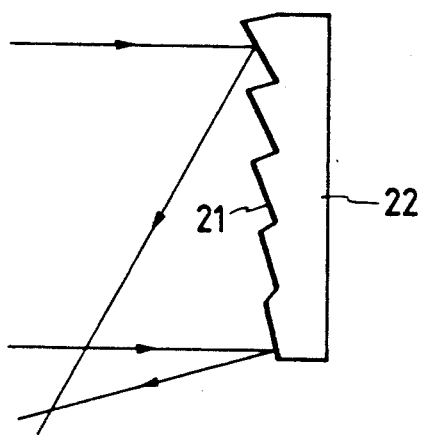
FIG. 8A is a diagram schematically showing an example of the cross-section taken on the line 8—8 in FIG. 7A or 7B.
Figure 8B:
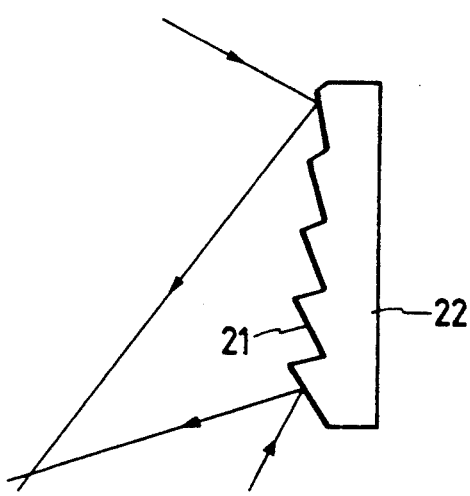
FIG. 8B is a diagram schematically showing another example of the cross-section taken on the line 8—8 in FIG. 7A or 7B.

FIGS. 8A and 8B are enlarged sectional views taken on the lines 8—8 in FIGS. 7A and 7B, respectively, illustrating examples in which the inclination angle θ of the micro HMs 21 are gradually varied in the direction of their arrangement. In FIG. 8A the inclination angle θ varies so that the reflecting surfaces of the micro HMs 21 sequentially vary counterclockwise as the uppermost micro HM 21 is approached. When arranged in a matrix form as shown in FIG. 7A, the micro HMs 21 of this structure form a Fresnel mirror equivalent to a cylindrical concave mirror, by which the reflected image can be enlarged in a direction perpendicular to the axis of the cylinder. When applied to the case of FIG. 7B, the micro HMs 21 form a Fresnel mirror equivalent to a concave mirror. In this instance, the image of a subject is enlarged (i.e. the angle of visibility is reduced). FIG. 8B shows an example in which the reflecting surfaces of the micro HMs 21 sequentially vary clockwise as the uppermost micro HM 21 is approached. The micro HMs 21 of such sequentially varying inclination angles, when arranged in the matrix form as shown in FIG. 7A, form a Fresnel mirror equivalent to a cylindrical convex mirror, by which the reflected image is compressed in a direction perpendicular to the axis of the cylinder. When arranged in a concentric form as depicted in FIG. 7B, they form a Fresnel mirror equivalent to a convex mirror, and hence widen the angle of visibility of the video camera 3.

Needless to say, the present invention is applicable not only to a display and image capture apparatus employing a CRT but also to apparatuses of the type utilizing a flat panel display such as a liquid crystal display.

With the half-transparent mirror array structure shown in FIG. 5, the ridges 21W each act as a prism on light transmitting therethrough. In other words, the optical path of light incident on the half-transparent mirror array 20 is bent. As a result, viewing the display surface 1A from the front thereof through the half-transparent mirror array 20 is equivalent to directly viewing the display surface 1A diagonally at a certain angle to the optical axis Ox. The direction of this inclination differs depending on whether the display surface 1A is viewed through the aforementioned micro HMs 21 or the intermediate portions d. In the case of viewing the displayed image, the optimum direction of the line of sight depends on which of the light rays through the micro HMs 21 and the intermediate portions predominantly contributes to the brightness of the image being observed. On the other hand, in the case of using a liquid crystal display as the display 1, the image quality is badly impaired unless the liquid crystal display is viewed from the direction in which the contrast ratio is high, because the contrast of the liquid crystal display is usually dependent on the viewing direction. Hence it is preferable that the optimum line-of-direction in which the optical path was bent by the half-transparent mirror array 20 and the optimum direction of visibility of the liquid crystal display coincide with each other. For instance, in the case where incident light is reflected by the half-transparent mirror array 20 diagonally upward as shown in FIG. 3 and the quantity of light from the displayed image through the intermediate portions d is predominant for the brightness of the image, provision is made for making the optimum direction of visibility of the liquid crystal display diagonally downward. Conversely, in the configuration of the apparatus in which the incident light is reflected obliquely downward, the half-transparent mirror array 20 is adapted to reflect incident light obliquely downward and the optimum direction of visibility of the liquid crystal display is selected to be obliquely upward.

Figure 9:
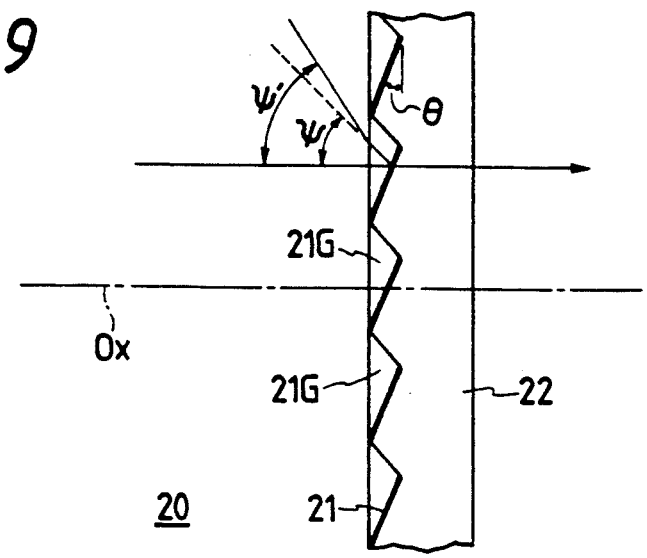
FIG. 9 is a sectional view showing another example of the half-transparent mirror 20.

In the half-transparent mirror array 20 of FIG. 5, gaps between adjoining ridges 21W may be filled with a transparent resin 21G so that the array surface becomes substantially flat, as shown in FIG. 9. This protects the micro HMs 21 and facilitates cleaning the surface of the half-transparent mirror array 20. Moreover, the transparent resin portions 21G each act as a prism for light reflected by the micro HM 21, with the result that an angle $\psi'$ of the reflected light emitted from the resin portion 21G with respect to the optical axis ox is greater than the reflection angle $\psi$. Hence, in the case where the video camera 3 is disposed in the direction of the angle $\psi'$, the half-transparent mirror array 20 shown in FIG. 9 affords further reduction of the inclination angle $\theta$ of the micro HM 21, facilitating the fabrication of the half-transparent mirror array 20 accordingly. When the refractive index of the transparent substrate 22 and the refractive index of the resin portion 21G are substantially equal, each resin portion 21G and each ridge 21W do not act as a prism for light passing therethrough and the line of sight to the display surface 1A from the front thereof is not bent. Also in the half-transparent mirror arrays 20 shown in section in FIGS. 8A and 8B the gaps between the ridges 21W may similarly be filled with the transparent resin 21G.

Incidentally, in the case where such a strip-like half-transparent mirror array 20 as shown in FIG. 4 or 5 is used in the apparatus of FIG. 3, the sectional configuration of a reflected light beam corresponding to a circularly-sectioned incident light beam remains unchanged in the horizontal direction but is compressed $\cos\psi = \cos 2\theta$ times, and hence becomes elliptic. Accordingly, the image of the caller M captured by the video camera 3 in such an optical system is also compressed in the vertical direction and hence gets distorted. The distortion increases with an increase in the angle $\theta$. Furthermore, since a mirror image by such a half-transparent mirror array 20 inclines forwardly, a trapezoidal distortion is introduced in the image formed on the video camera 3 (for example, the head of the caller M is enlarged and his leg portion reduced) and the distortion also increases with an increase in the angle $\theta$.

Figure 10:
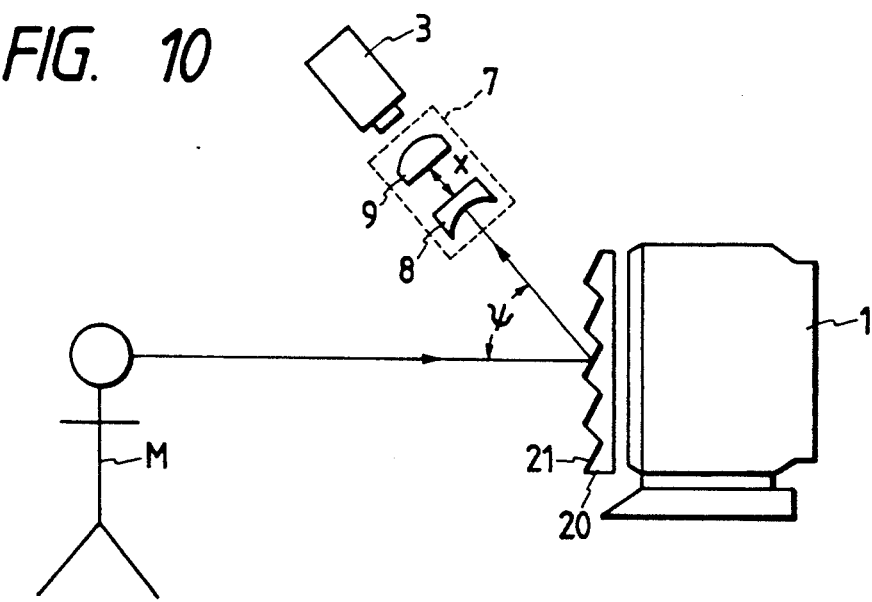
FIG. 10 is a side view illustrating an embodiment of the display and image capture apparatus employing a distortion correcting beam expander optical system.

FIG. 10 schematically illustrates the configuration of an embodiment of the display and image capture apparatus of the present invention which is designed to correct the above-noted distortion of an image. The reflected image from the half-transparent mirror array 20 is captured by the video camera 3 after passing through a beam expander optical system 7 comprised of a cylindrical concave lens 8 and a cylindrical convex lens 9. The beam expander optical system 7 is used to enlarge or reduce the reflected image in a direction in which the distortion of the image in the vertical direction is corrected by the cylindrical lenses and 9, and the reflected image compressed by the half-transparent mirror array 20 is enlarged conversely, by which the distortion of the image can be corrected. Since the enlargement ratio or reduction ratio of the reflected image depends on the focal lengths of the cylindrical lenses 8 and 9 and the distance x therebetween, the trapezoidal distortion of the reflected image can also be corrected by setting the focal lengths and the distance x within certain limits.

Figure 11:
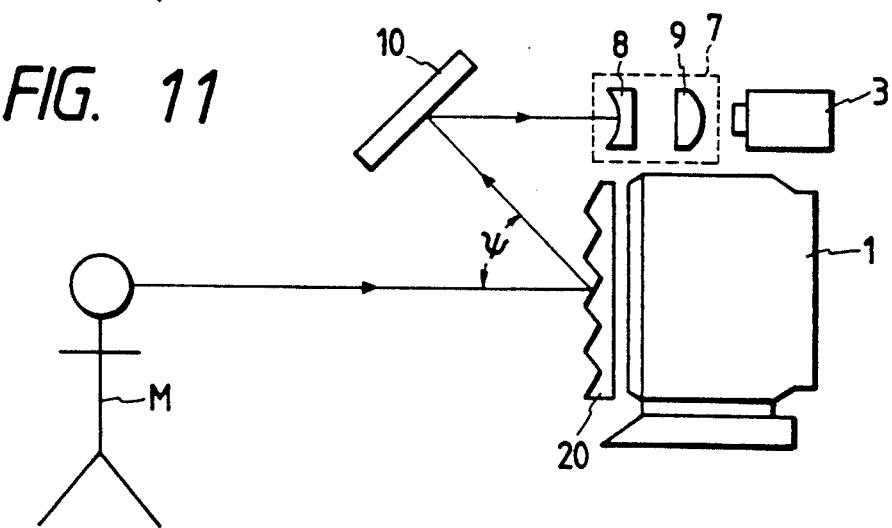
FIG. 11 is a side view illustrating another embodiment of the display and image capture apparatus utilizing the distortion correcting beam expander optical system.

FIG. 11 schematically illustrates the configuration of another embodiment of the display and image capture apparatus provided with the optical system for correcting a distortion of an image. The reflected image from the half-transparent mirror array 20 is reflected substantially horizontally by a mirror 10 disposed at the position of the beam expander optical system 7 in FIG. 10 and the reflected image from the total reflection mirror 10 is captured by the video camera 3 mounted on the display 1. In FIG. 10 the reflected image from the half-transparent mirror array 20 is captured by the video camera 3 and hence is reversed, but in the embodiment of FIG. 11 the image is reflected twice by the half-transparent mirror array 20 and the total reflection mirror 10, and hence is not reversed.

Figure 12A:
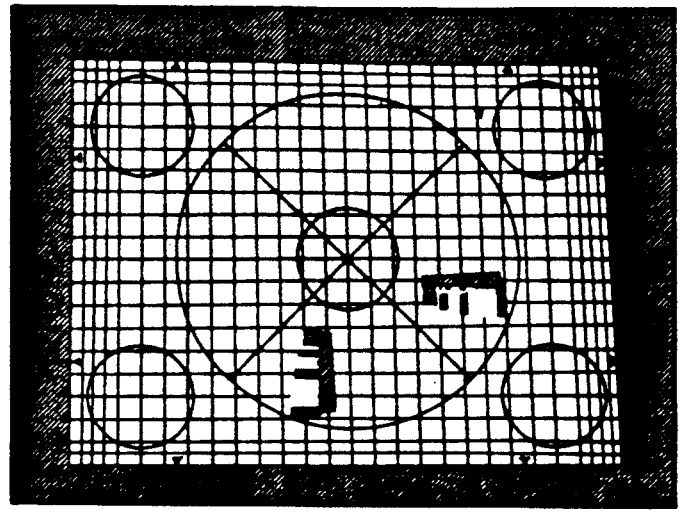
FIG. 12A is a drawing of an ITE test chart obtained in the case where the beam expander optical system was used.
Figure 12B:
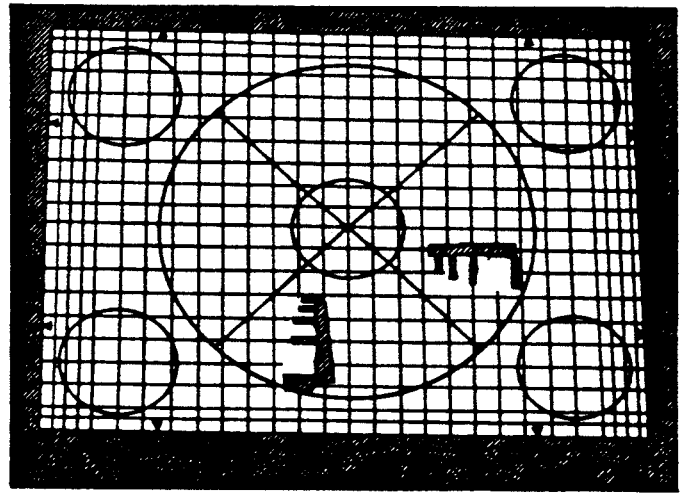
FIG. 12B is a drawing of an ITE test chart obtained when no beam expander optical system was used.

FIGS. 12A and 12B show the results of image-capturing experiments on the apparatus of FIG. 11 configuration in the cases where the beam expander optical system 7 was used and not used. The subjects used are ITE test charts, which reveal that when no beam expander optical system is used, a circle is distorted vertically and hence is elliptic as shown in FIG. 12B but that when the beam expander optical system is used, a circle is obtained as shown in FIG. 12A.

Figure 13:
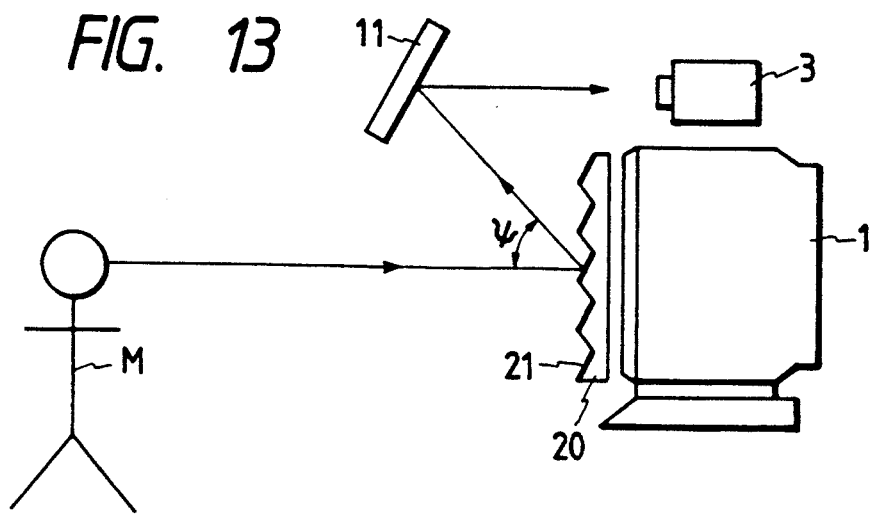
FIG. 13 is a diagram of still another embodiment of the display and image capture apparatus capable of correcting distortion.
Figure 14:
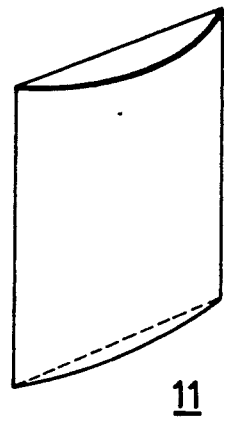
FIG. 14 is a perspective view of a curved mirror which is used in the FIG. 13 embodiment for correcting elliptic and trapezoidal distortions at the same time.

FIG. 13 schematically illustrates still another embodiment of the display and image capture apparatus designed to correct a distortion of an image. This embodiment does not employ the cylindrical lenses 8 and 9 and replaces the total reflection mirror 10 with a curved mirror 11. The micro HMs 21 of the half-transparent mirror array 20 are constructed so that an image is reflected therefrom diagonally upward, and the reflected image is reflected by the curved mirror 11 placed diagonally above the half-transparent mirror array 20, thereafter being captured by the video camera 3 mounted on the display 1. The reflected image from the half-transparent mirror array 20 is compressed in the vertical direction. In this embodiment, however, a cylindrical convex mirror is used as the curved mirror 11 and is disposed so that the axis of its cylindrical configuration is in the plane of the paper of the drawing (in a vertical plane viewed from the caller M) and the reflected image is compressed in the horizontal direction to about the same extent as in the vertical direction, whereby the distorted image can be corrected. The curved mirror 11 used herein possesses a combined function of a cylindrical lens and a mirror. Moreover, since the enlargement and reduction ratios of the image reflected by the curved mirror 11 depend on its curvature, it is also possible to correct the trapezoidal distortion by distributing the curvature of the mirror 11 to some extent so that its radius of curvature is, for example, small at the top and large at the bottom, as shown in an exaggerated perspective view in FIG. 14. In addition, since a simple optical system including the curved mirror 11 alone is employed as a substitute for the beam expander optical systems 7 described above in respect of FIGS. 10 and 11, the display and image capture apparatus of this embodiment is small and low-cost.

While in the above description cylindrical convex mirror is employed, the elliptic distortion can be corrected by enlarging the reflected image from the half-transparent mirror array 20 in the vertical direction through use of a cylindrical concave mirror disposed so that its axis may be horizontal, as described previously in connection with the combination of the structures of FIGS. 7A and 8A.

Figure 15:
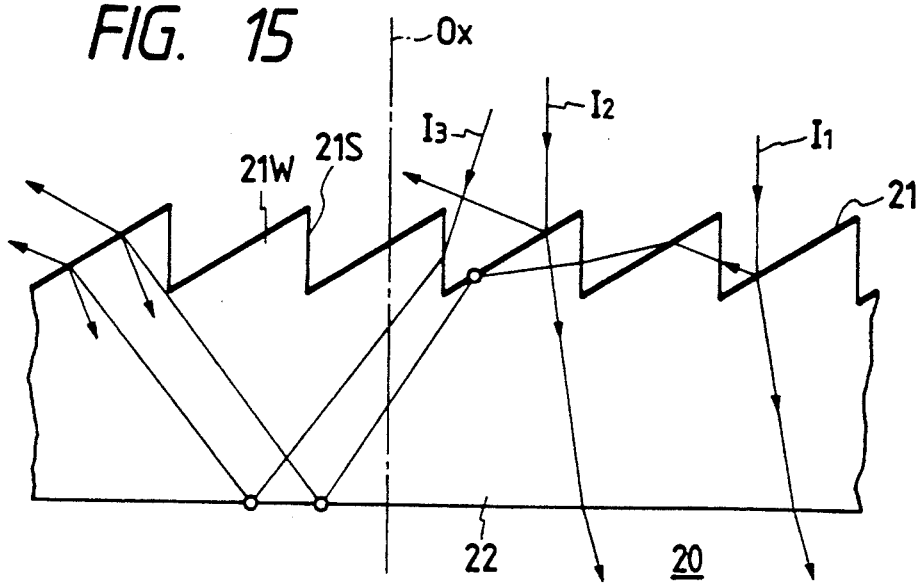
FIG. 15 is a sectional view for explaining abnormal optical paths in the half-transparent mirror array.

In the case where the spacing d of the micro HMs 21 of the half-transparent mirror-array 20 shown in FIG. 5 is selected small, for example, zero, an abnormal path such as indicated by $I_1$ in FIG. 15 is formed along which light reflected by the micro HM 21 is incident on the side wall 21S of the adjoining ridge 21W, then totally reflected by, for example, the back of the micro HM 21 formed on that adjoining ridge 21W (all points of total reflection being indicated by small white circles), further reflected by the back of the substrate 22 and one portion of the thus reflected light is emitted from the half-transparent mirror array 20 to the video camera 30. As a result, a ghost image is formed along with a normal image (i.e. a directly reflected image) which is formed by light having reached the video camera 3 via a normal path indicated by a ray $I_2$. Similarly, a ray $I_3$ incident directly on the side wall surface 21S of the ridge 21W may also cause such a ghost image. There is the possibility that various ghost images are formed by various stray rays other than the directly reflected rays, but it is very difficult theoretically to predict them. Then it is desirable to prevent light coming along the optical axis Ox from the subject M standing in front of the display 1 and is reflected by the micro HM 21 from entering the side wall 21S of the adjoining ridge 21W as in the case of the ray $I_1$. One effective method therefor is to provide the intermediate portions d between the micro HMs 21 as depicted in FIG. 5. In the example of FIG. 5 the adjoining micro HMs 21 are spaced apart by forming the side wall 21S of the ridge 21W at the angle $\phi$ to the optical axis Ox. If the angle $\phi$ is selected equal to or larger than the reflection angle, $\psi = 2\theta$, of incident light parallel to the optical axis Ox and reflected by the micro HM 21, the reflected light will not enter the side wall 21S of the adjoining ridge 21W. In other words, it is desirable to select the spacing d or the angle $\phi$ such that $d = W \sin\theta \cdot \tan\phi \geq W \sin\theta \cdot \tan 2\theta$. For example, in the case where the inclination angle $\theta$ of the micro HM 21 was 25°, the inclination angle $\phi$ of the side wall 21S was $2\theta = 50°$ and the transparencies of the micro HM and the half-transparent mirror array 20 on the side wall 21S were 30% and 70%, respectively, the brightness on the display surface measured through the half-transparent mirror array 20 was 50% higher than in the case where the inclination angle $\phi$ of the side wall surface 21S was zero.

Thus, the spacing d of the micro HMs 21 has a dual effect of preventing ghost images while at the same time enhancing the brightness of a displayed image as referred to previously.

Incidentally, the spacing d in FIG. 5 is determined in relation to the width W and inclination $\theta$ of each micro HM 21, but since there are possibilities, in practice, of various ghosts being formed not only by incident light beams parallel to the optical axis Ox but also by light beams of various incident angles, it is necessary to experimentally determine the optimum spacing d which minimizes the formation of ghosts in the video camera. Also in the case of the half-transparent mirror array 20 shown in FIG. 4, the formation of ghosts can be reduced by suitably spacing the micro HMs 21 apart but the optimum value of the spacing d is not necessarily equal to the optimum value in the case of FIG. 5.

Figure 16A:
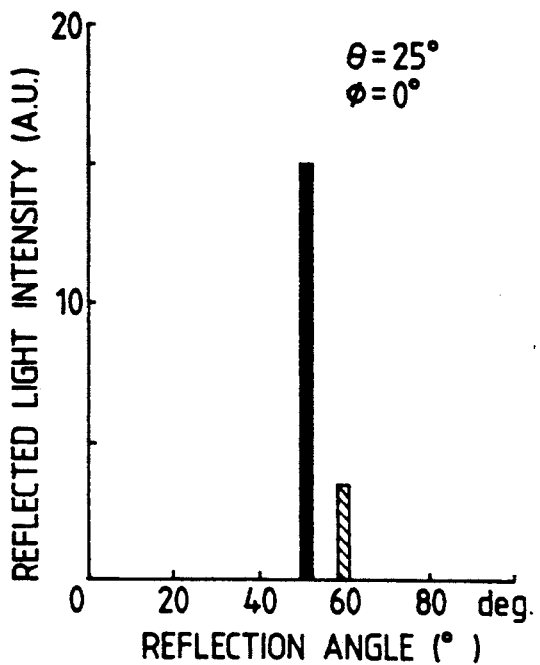
FIG. 16A is a graph showing the measured relationships between the angular positions where a direct reflected image and ghosts appeared and their intensities when the angle of inclination of the side wall surface of the micro HM was zero degrees.
Figure 16B:
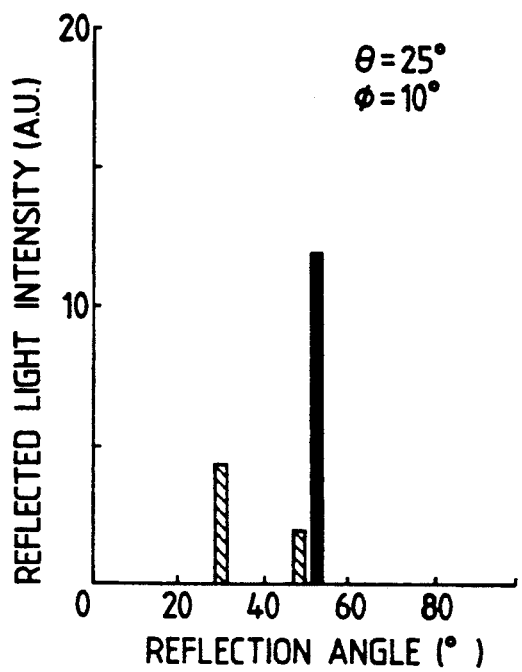
FIG. 16B is a graph showing the measured relationships between the angular positions where the direct reflected image and the ghosts appeared and their intensities when the angle of inclination of the side wall surface of the micro HM was 10 degrees.
Figure 16C:
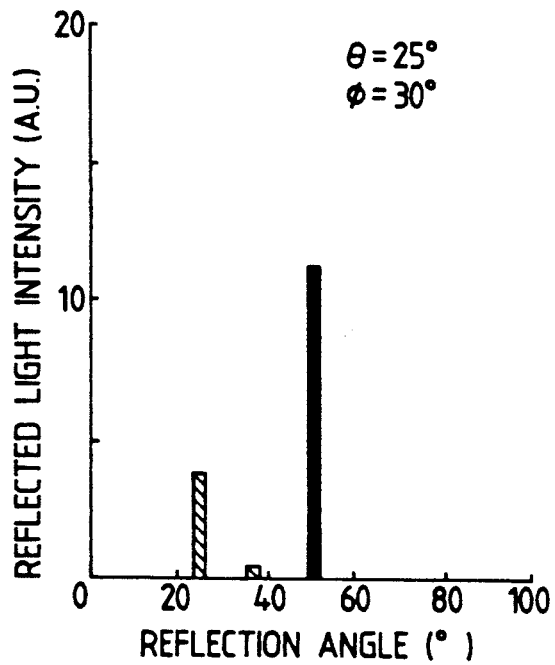
FIG. 16C is a graph showing the measured relationships between the angular positions where the direct reflected image and the ghosts appeared and their intensities when the angle of inclination of the side wall surface of the micro HM was 30 degrees.
Figure 16D:
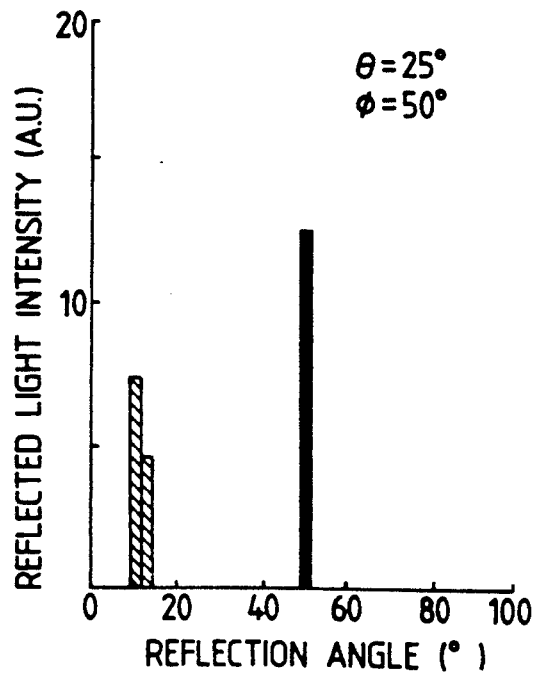
FIG. 16D is a graph showing the measured relationships between the angular positions where the direct reflected image and the ghosts appeared and their intensities when the angle of inclination of the side wall surface of the micro HM was 50 degrees.

Four samples of the half-transparent mirror array 20 shown in FIG. 5 were fabricated, in which the angles $\theta$ were all 25° and the angles $\phi$ were 0°, 10°, 30° and 50°, respectively. FIGS. 16A, 16B, 16C and 16D are graphs showing the relationships between the angular positions where light directly reflected by the half-transparent mirror arrays 20 and other reflected images (hereinafter referred to as ghosts) appeared and the intensity of the reflected light when light from a point light source was applied to the half-transparent mirror arrays 20. The abscissa represents the reflection angle position where images were detected and the ordinate the intensity of the detected light. The intensity of the directly reflected light is indicated by a black-painted bar and the ghosts are indicated by hatched bars. FIG. 16A shows the case of $\phi = 0$, from which it is seen that a ghost of relatively high intensity appears in close proximity to the directly reflected image. The angular position and intensity of the ghost are different for different angles $\phi$, as shown in FIGS. 16B to 16D. Thus, the optimum value of the angle $\phi$ is determined by experiments so that the ghost is formed outside the image-capturing visual field or its intensity is below a given level. When the angle $\theta$ is 25°, the angle $\phi$ may preferably be greater than 30°, as seen from FIGS. 16A to 16D.

Figure 17:
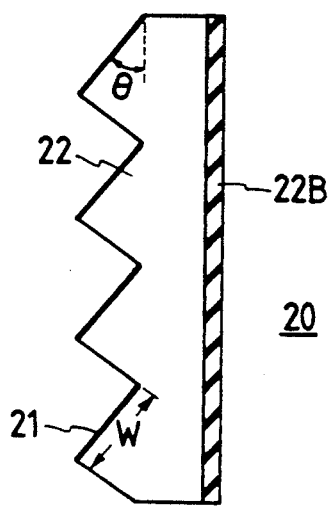
FIG. 17 is a diagram schematically illustrating another example of the half-transparent mirror array for use in the display and image capture apparatus according to the present invention.

The occurrence of the ghost is attributable partly to the reflection of light, in particular, total reflection, by the back of the substrate 22 of the half-transparent mirror array 20, as depicted in FIG. 15. In view of this, as shown in FIG. 17, an antireflection layer 22B may be formed all over the back of the substrate 22 to decrease the reflectivity thereon in the half-transparent mirror arrays 20 for use in the embodiments of FIGS. 3, 10, 11 and 13. By forming the antireflection layer 22B in a multilayer structure, the reflectivity can be decreased over the entire wavelength range of visible light—this affords substantial reduction of the intensity of light reflected by the back of the transparent substrate 22. As a result, the brightness of a ghost which is caused by the reflected image from the back of the transparent substrate 22 and appears in the display surface 1A can be lowered, and consequently, the image quality on the display surface 1A can be improved.

Figure 18:
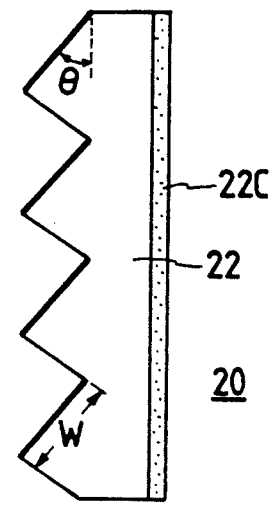
FIG. 18 is a diagram schematically illustrating still another example of the half-transparent mirror array for use in the display and image capture apparatus of the present invention.

FIG. 18 illustrates in section another example of the half-transparent mirror array 20 adapted to decrease ghosts attributable to the reflection on the back of the half-transparent mirror array 20. In this example the antireflection layer 22B in FIG. 17 is replaced by a layer 22C which disperses incident light and which is also formed all over the back of the transparent substrate 22. The incident light dispersing layer 22C is provided by, for example, forming fine irregularities over the entire area of the back of the transparent substrate 22, by which light is dispersed or prevented from reflection to a specific direction. Consequently, it is possible to completely remove from the display surface 1A the ghost which is caused by the reflection from the back of the half-transparent mirror array 20. Further, since the user of the display and image capture apparatus according to the present invention, which employs the half-transparent mirror array 20 provided with such an incident light dispersing layer 22C, watches the display surface 1A through the light dispersing layer 22C, serious deterioration of the image quality on the display surface 1A can be prevented by placing the half-transparent mirror array 20 in close proximity to the display surface 1A, because the half-transparent mirror array 20 can be fabricated in the form of a relatively thin sheet as is the case with a plastic Fresnel lens.

There is a case where a liquid crystal display, which is a flat panel display, is used as the display 1 so as to reduce the size of the display and image capture apparatus, but the liquid crystal display has the defect of a small angle of visual field. The light dispersing layer 22C formed in the back of the half-transparent mirror array 20 also produces an effect of increasing the angle of field of the liquid crystal display, since an image displayed thereon is dispersed over a wide area.

The foregoing description has been given of the case where light from the subject (the caller) M and light from its background form a ghost, but in the apparatuses shown in FIGS. 3, 10 and 11 light from the image displayed on the display 1 is incident on the video camera 3 through the half-transparent mirror array 20, by which the displayed image can be captured while being superimposed on the directly reflected image.

Figure 19:
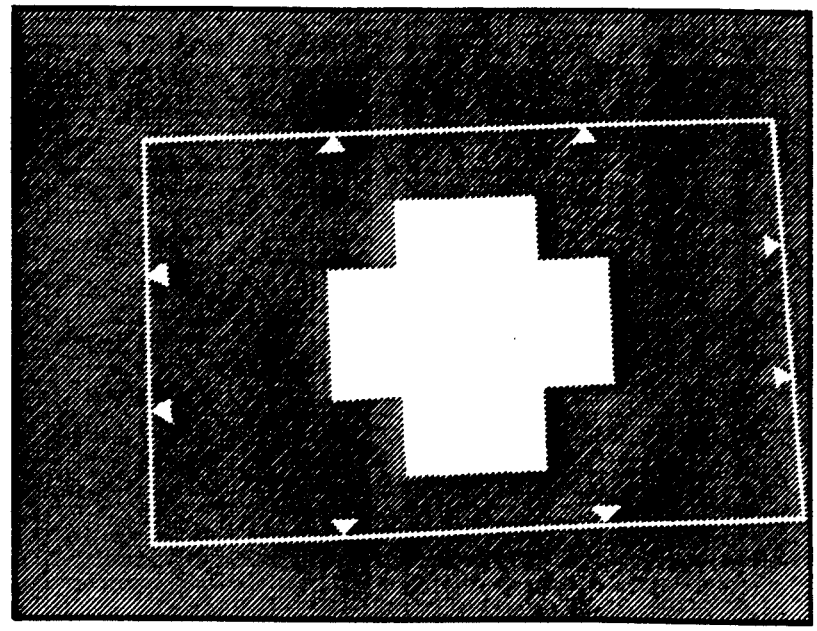
FIG. 19 is a diagram showing an example of a drawing illustrating a ghost image caused by a displayed image.

FIG. 19 is a photograph showing that a ghost image of the display surface, besides the directly reflected image, is present in a captured image in the display and image capture apparatus depicted in FIG. 3. The photograph was taken when capturing a reflected image from a half-transparent mirror array 20 placed in close contact with the display surface of a liquid crystal display used as the display 1, the entire area of the display surface being held at the maximum display brightness level. The subject m used is a thick cross-shaped test chart. As will be seen from FIG. 19, there is a whitish area of lowered contrast in the center lower portion of the photograph—this indicates that the light from the display reached the video camera 3.

Figure 20:
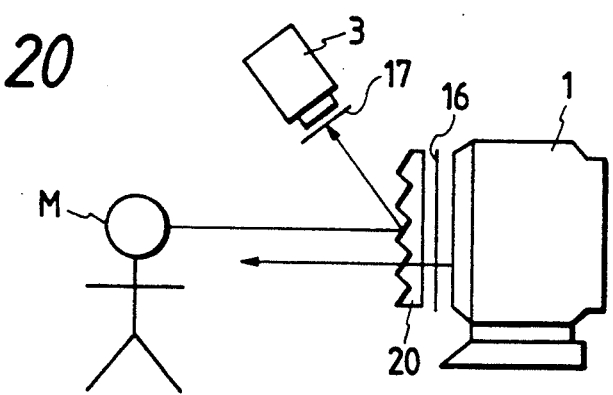
FIG. 20 is a side view illustrating an embodiment of a configuration for preventing the ghost image from appearing.

FIG. 20 schematically illustrates an embodiment of the display and image capture apparatus configured to prevent the formation of the above-mentioned displayed image in the captured image. In this embodiment a polarizer 16 is interposed between the display surface 1A and the half-transparent mirror array 20 and another polarizer 17 is disposed in front of the video camera 3 so that its direction of polarization perpendicularly intersects that of the polarizer 16. Light from an image displayed on the display surface 1A is linearly polarized by the polarizer 16 and is emitted therefrom through the half-transparent mirror array 20, and hence the caller M can observe the image being displayed. Yet the linearly polarized light is intercepted by the polarizer 17, and hence is not incident on the video camera 3. In this instance, however, the brightness of the image viewed from the caller M and the quantity of light incident on the video camera 3 from the subject M both decrease.

Figure 21:
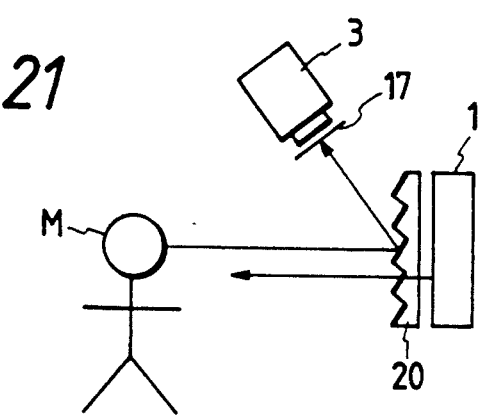
FIG. 21 is a side view illustrating another embodiment of the configuration for preventing the ghost image from appearing.

FIG. 21 shows the case of employing a transmission type liquid crystal display as the display 1. Since the liquid crystal display has polarizers mounted on the front and back of its liquid crystal panel in close contact therewith, the same effect as mentioned above is obtainable simply by disposing, in front of the video camera 3, the polarizer 17 having its direction of polarization perpendicularly intersecting that of the polarizer mounted on the front of the liquid crystal panel. In this case, the brightness of the display surface 1A does not diminish. Since the liquid crystal display itself is small in depth, the combined use of the liquid crystal display and the polarizer 17 as shown in FIG. 21 also serves the purpose of forming a display and image capture apparatus of a small depth.

Figure 22:
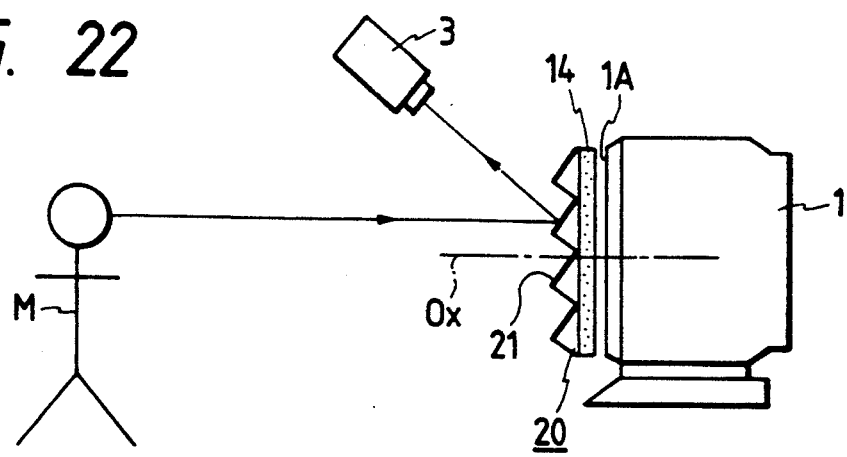
FIG. 22 is a side view illustrating still another embodiment of the configuration for preventing the ghost image from appearing.

FIG. 22 schematically illustrates another embodiment of the display and image re apparatus intended to prevent the formation of a ghost image of the display image in the image captured by the video camera 3. In this embodiment a plate 14 which has visual field selectivity is interposed between the half-transparent mirror array 20 and the display surface 1A. The visual field selective plate 14 is commercially available under the trade name "Angle 21" fabricated by Nihon Ita Garasu K.K., for instance. The visual field selective plate 14 is opaque to an eye which views the plate at an angle smaller than a predetermined value to the plate surface and is transparent to the eye viewing the plate at larger angles. For instance, when the visual field selective plate 14 is viewed from its front, an area within a certain visual field about the line of sight perpendicular to the plate is transparent and the other areas are all opaque.

In the apparatus of FIG. 22 light from the displayed image is not incident on the video camera 3, since the camera 3 is placed in the direction of the line of sight in which the visual field selective plate 14 looks opaque. On the other hand, the caller M stands in front of the visual field selective plate 14, and hence is allowed to see the displayed image. More specifically, when the above-mentioned plate known under the name "Angle 21" is used as the visual field selective plate 14, the viewing direction in which the plate 14 looks opaque is in the range of from 30 to 60 degrees with respect to the normal (i.e. the optical axis) Ox to the half-transparent mirror array 20, so that the video camera 3 can be placed in the above-said opaque viewing direction by setting the inclination angle $\theta$ of the micro HMs 21 of the half-transparent mirror array 20 to a value within the range of 20 to 25 degrees. Incidentally, the half-transparent mirror array 20 may also be formed integrally with the visual field selective plate 14 on the surface thereof, using the plate 14 as the substrate 22.

Figure 23:
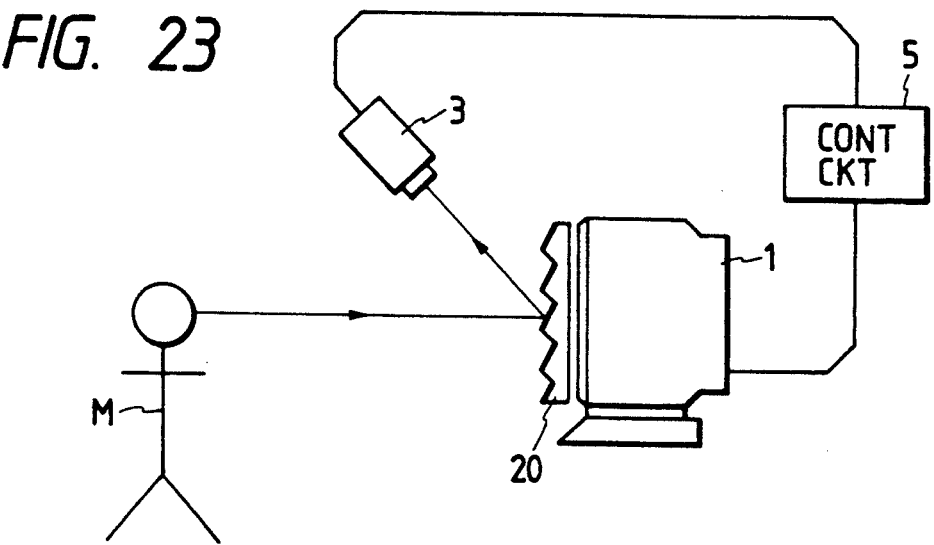
FIG. 23 is a side view illustrating an embodiment of a configuration for electrically preventing the ghost from appearing.
Figure 24:
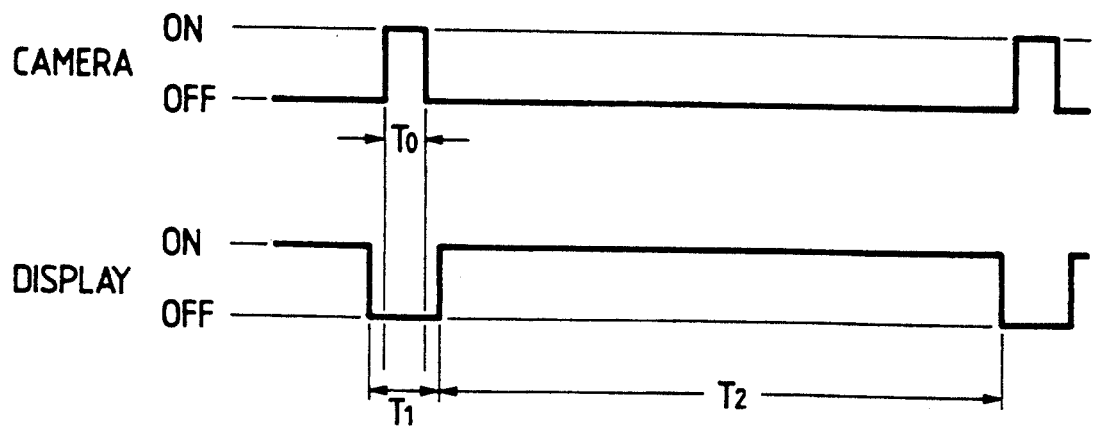
FIG. 24 is a timing chart for explaining control of the display and the video camera in the embodiment of FIG. 23.
Figure 25:
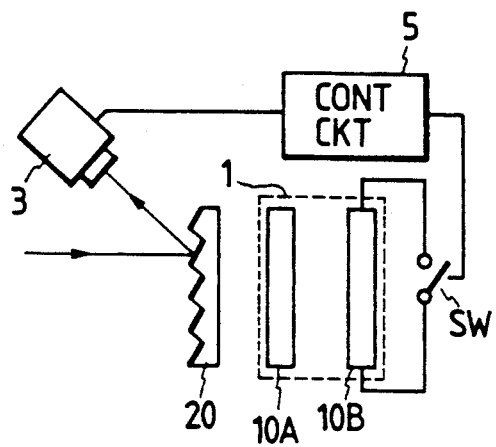
FIG. 25 is a diagram schematically showing a configuration for controlling a back light in the case of employing a liquid crystal display in the FIG. 23 embodiment.

Although the embodiments of FIGS. 20, 21 and 22 have been described to optically intercept the light directed toward the video camera 3 from the display surface 1A, the light may also be blocked electrically as described below. FIG. 23 schematically illustrates a first embodiment intended to block the light electrically. As is the case of the FIG. 3 embodiment, the display 1, the half-transparent mirror array 20 and the video camera 3 are provided, and in addition a control circuit 5 is provided which is connected to the display 1 and the video camera 3. The control circuit 5 is used to control the display operation of the display 1 and the image-capturing operation of the video camera 3 in association with each other. FIG. 24 shows the operation of the control circuit 5. The control circuit 5 repeats holding the display 1 in the OFF state for a first period $T_1$ and in the ON state for a second period $T_2$ while at the same time controlling the video camera 3 to be ON only for a period $T_0$ in each period $T_1$. Thus no display image will be formed during the image capturing operation. In the case of employing, as the display 1, a liquid crystal display made up of a liquid crystal panel 10A and a back light 10B as depicted in FIG. 25, the above-mentioned control operation is performed by turning ON and OFF a lighting switch SW of the back light 10B under control of the control circuit 5. The liquid crystal panel 10A is always driven by applying thereto a voltage from a liquid crystal driver (not shown). In the first period $T_1$ including the image capturing period $T_0$ the switch SW is in the OFF state to hold the back light 10B OFF and hence blacken a display image on the liquid crystal display 1. In the second period $T_2$ no image capturing operation takes place and the switch SW is turned ON to light the back light 10B, providing a display on the liquid crystal display 1.

Thus, in this embodiment a voltage is always applied to the liquid crystal panel 10A to hold it in an active state and the control circuit 5 controls the driving of the video camera 3 and the back light 10B to selectively perform the image capturing operation and the display operation.

Figure 26:
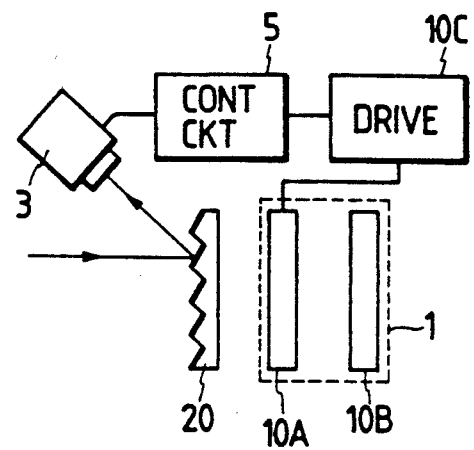
FIG. 26 is a diagram schematically showing a configuration for controlling an image display in the case of employing the liquid crystal display in the FIG. 23 embodiment.

FIG. 26 schematically illustrates another embodiment of the display and image capture apparatus which effects the ON-OFF control of the display operation by the control circuit 5. This embodiment is identical with the FIG. 24 embodiment in the use of the liquid crystal display 1 composed of the liquid crystal panel 10A and the back light 10B but differs therefrom in the method of controlling the image capturing operation and the display operation. In this embodiment the back light 10B is held ON at all times. In the first period $T_1$ including the image capturing period $T_0$ the image capturing operation takes place while holding the display on the liquid crystal display 1 black by maintaining the driving voltage thereto at a black display level or inputting thereto data for the black display. In the second period $T_2$ the display operation is carried out with the driving voltage of the liquid crystal drive 10C held at a normal display level.

As mentioned above, in this embodiment the back light 10B is always lighted while at the same time the image capturing operation and the display operation are selectively performed by driving the video camera 3 and the liquid crystal panel 10A under control of the control circuit 5.

Figure 27:
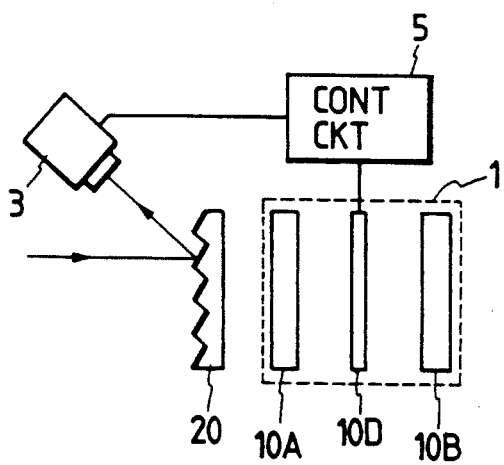
FIG. 27 is a diagram showing a configuration for controlling a shutter disposed in front of the back light in the case of employing the liquid crystal display in the FIG. 23 embodiment.

FIG. 27 schematically illustrates another embodiment of the display and image capture apparatus of the type involving the ON-OFF control of the display operation. This embodiment is identical with the embodiments of FIGS. 25 and 26 in the use of the liquid crystal display 1 but differs therefrom in that a shutter 10D is interposed between the liquid crystal panel 10A and the back light 10B forming the liquid crystal display 1. The shutter 10D may be formed by a liquid crystal panel which can be controlled, by ON-OFF control of a voltage or current applied thereto, to permit the passage therethrough of light and inhibit the passage therethrough of light or absorb light. Alternately, a mechanical shutter may also be used. The shutter 10D is placed under control of the control circuit 5.

With such an arrangement, the liquid crystal panel 10A is always driven, and in the first period $T_1$ including the image capturing period $T_0$ the image capturing operation takes place while holding the display on the liquid crystal display 1 black by blocking the light from the back light 10B with the shutter 10D being closed, whereas in the second period $T_2$ the display operation takes place while holding the shutter 10D open to permit the passage therethrough of the light from the back light 10B. In this instance, the back light 10B may be continuously driven or controlled to turn ON and OFF as in the embodiment of FIG. 25. The video camera 3, the back light 10B and the shutter 10D are placed under control of the control circuit 5.

Figure 28:
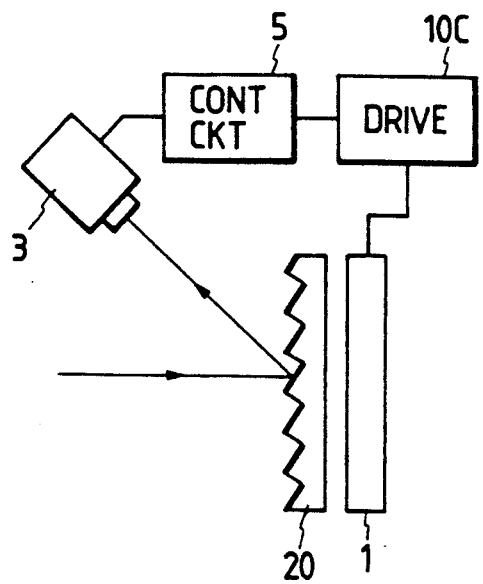
FIG. 28 is a diagram schematically showing a configuration for controlling a display driver in the case of employing an emissive display in the FIG. 23 embodiment.

FIG. 28 schematically illustrates still another embodiment, which employs, as the display 1, an emissive display such as an EL display, plasma display, or CRT. Since the display 1 is emissive, this embodiment does not call for the back light 10B needed in the embodiments described above in respect of FIGS. 25, 26 and 27. In the first period $T_1$ including the image capturing period $T_0$ the image capturing operation is performed while holding the display image on the emissive display 1 black by maintaining OFF the voltage of the driver 10C for driving the emission display 1 or inputting thereto data for the black display. In the second period $T_2$ the drive voltage is applied via the driver 10C to the display 1 to provide thereon a display.

In this case, it is also possible to utilize an arrangement in which the shutter 10D used in the FIG. 27 embodiment is placed in front of the emissive display 1, the display 1 is always held active and the shutter 10D is driven ON and OFF to switch ON and OFF the display image provided on the emissive display 1.

While in FIGS. 23 and 25 to 28 the video camera 3 is positioned diagonally above the display 1, the video camera 3 may be placed diagonally below the display 1 or diagonally to the left or right of the display 1, by selecting the rotational angular position of the half-transparent mirror array 20. Various circuits or CPU can be used as the control circuit 5.

The foregoing embodiments have been described to use the half-transparent mirror array 20 which reflects an incident light image to one direction (toward the video camera 3) by the array of the micro HMs 21 each inclined at the angle $\theta$. In the case of employing such a half-transparent mirror array 20 as shown in FIG. 5, however, light incident on the side wall surface 21S with no mirror formed thereon is partly reflected to a direction which is dependent on the inclination angle $\phi$ and different from the direction toward the video camera 3, and consequently, the utilization efficiency of light is impaired accordingly. Now, a description will be given of an embodiment in which each inclined side wall surface 21S also has a micro HM and an image produced by light reflected therefrom is captured by another video camera so that two image signals are effectively utilized.

Figure 29:
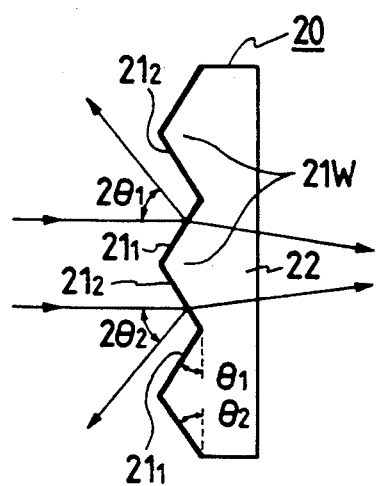
FIG. 29 is a sectional view showing the structure of a two-direction reflecting half-transparent mirror array for use in the display and image capture apparatus of the present invention.

FIG. 29 is a sectional view showing the half-transparent mirror array 20 which is used for the above-mentioned purpose. There are formed micro HMs $21_1$ and $21_2$ on two slopes of each of the ridges 21W formed in parallel on one side of the transparent substrate 22. The inclination angles $\theta_1$ and $\theta_2$ of the micro HMs $21_1$ and $21_2$ may be equal to or different from each other and are properly selected such that no ghost images will be formed as referred to previously.

Figure 30:
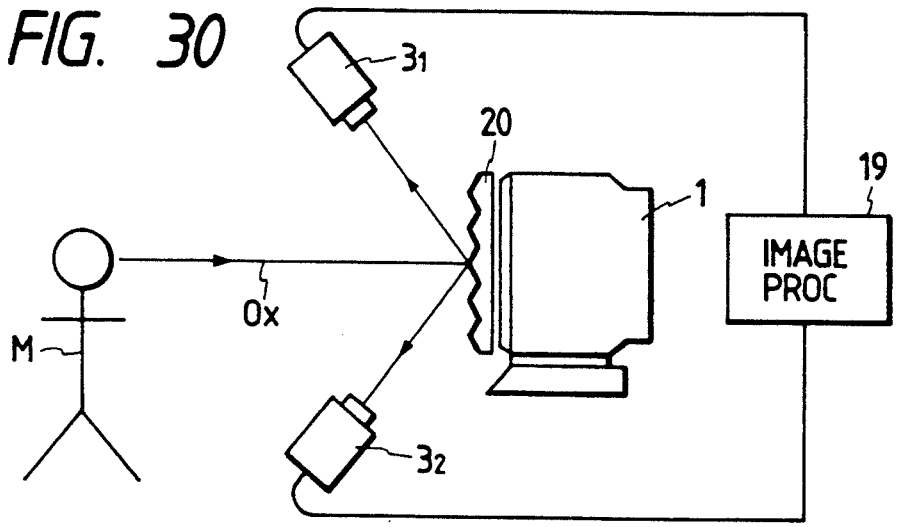
FIG. 30 is a side view illustrating an example of the configuration of the display and image capture apparatus utilizing the half-transparent mirror array depicted in FIG. 29.

FIG. 30 schematically illustrates the configuration of the display and image capture apparatus according to the present invention which employs the half-transparent mirror array 20 depicted in FIG. 29. In this example the image of the subject M is reflected upward and downward by the half-transparent mirror array 20 and the reflected images are captured by video cameras $3_1$ and $3_2$ disposed above and below the display 1. An image processor 19 performs processing for superimposing video signals of the images captured by the video cameras $3_1$ and $3_2$. The resulting video signal has an amplitude substantially twice that obtainable with the use of one video camera, and consequently, the brightness of the display image can be increased accordingly.

Figure 31:
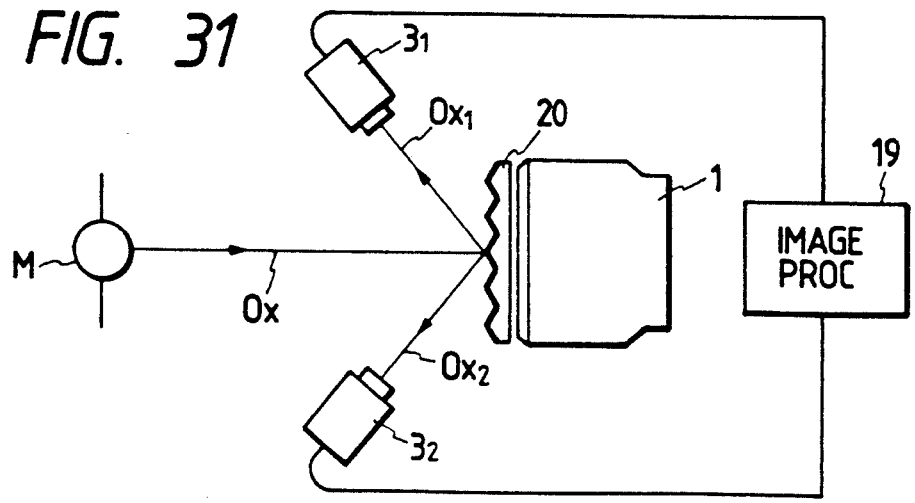
FIG. 31 is a plan view illustrating another example of the configuration of the display and image capture apparatus employing the half-transparent mirror array depicted in FIG. 29.

While in the FIG. 30 embodiment the incident light is reflected upward and downward, it may also be reflected to the right and left. FIG. 31 is a plan view showing the configuration for reflecting the incident light to the right and left. As shown, the rotational angular position of the half-transparent mirror array 20 is determined so that the ridges 21W extend in the vertical direction. Consequently, the incident light is reflected to the right and left by the vertically extending micro HMs $21_1$ and $21_2$. The video camera 3 receives the reflected rays of light to capture the image of the caller M. The two video signals thus obtained are superimposed by the image processor 19 to thereby provide an increased amplitude.

Figure 32:
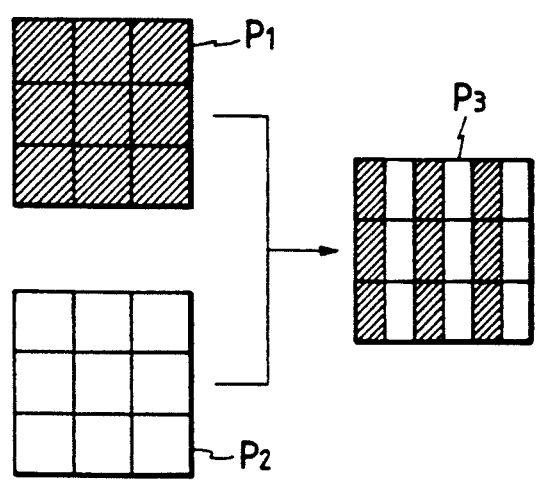
FIG. 32 is a diagram for explaining how two captured images obtained with the configuration of FIG. 31 are superimposed one on the other to form a synthesized image.

High resolution can also be achieved by synthesizing or combining the two captured image signals in the embodiments of FIGS. 30 and 31. For example, by superimposing images $P_1$ and $P_2$ captured by the video cameras $3_1$ and $3_2$ as depicted in FIG. 32, an image $P_3$ can be displayed with apparently two-fold resolution in the vertical or horizontal direction.

Figure 33:
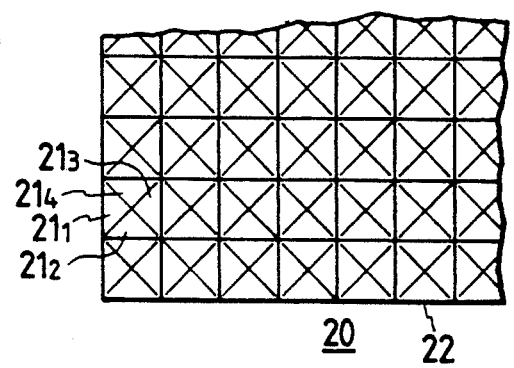
FIG. 33 is a front view showing a portion of a half-transparent mirror array which reflects light in four directions.

In the embodiments of FIGS. 30 and 31 the image of the subject M is reflected in two directions, but the image can be reflected in more directions by designing the structure of the micro HM. FIG. 33 is a front view showing a part of the half-transparent mirror array 20, which has quadrangular pyramidal projections arranged in a matrix form on one side of the transparent substrate 22 and has micro HMs $21_1$ to $21_4$ formed on four slopes of each pyramidal projection. With such a structure, incident light can be reflected by the micro HMs $21_1$ to $21_4$ in four directions. This further enhances the quality of the captured image as compared with that obtainable with the structure of the FIG. 20 embodiment. Needless to say, four video cameras are used in this case.

Figure 34:
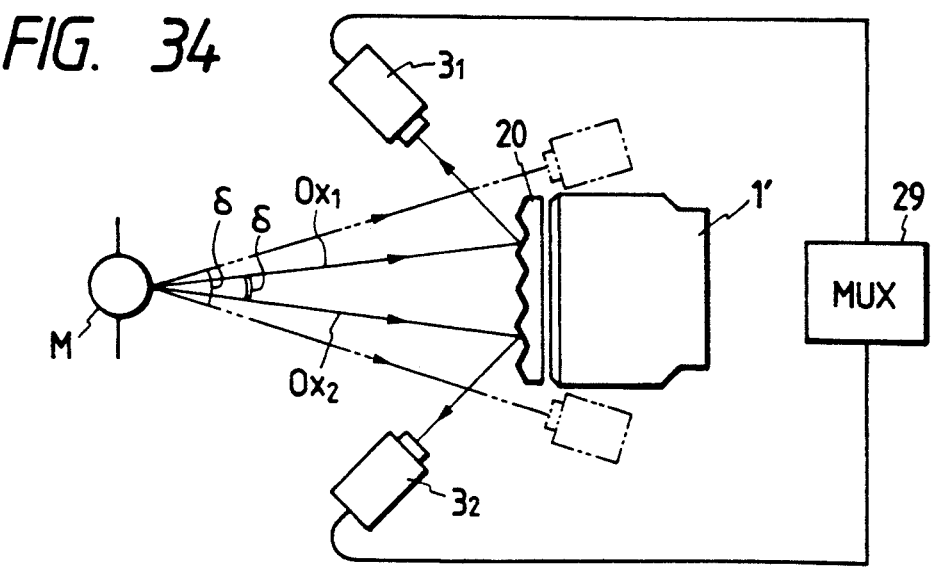
FIG. 34 is a plan view showing the configuration of a display and image capture apparatus which provides a 3D display.

FIG. 34 schematically illustrates a modified form of the FIG. 31 embodiment, in which the two video signals available from the left and right video cameras $3_1$ and $3_2$ are not combined as in FIG. 31 but instead they are multiplexed by a multiplexer 29 and then transmitted to the remote station, where the transmitted signal can be demultiplexed into two video signals for 3D display use. Since the image of the subject M is reflected by the half-transparent mirror array 20 to the right and left, image data for 3D display can be obtained through utilization of the parallax between the reflected images. In the case of capturing the image of the subject M directly by video cameras disposed on the right and left of a 3D display 1' as indicated by the two-dot chain lines, without employing the half-transparent mirror array 20, an angle of parallax (an angle at which the subject M is viewed from the two video cameras along their optical axes) δ increases with an increase in the size of the display surface of the 3D display 1'. On this account, the depth effect by parallax is so much emphasized that images for right and left eyes are not easily combined into one 3D image in the brain, resulting in fatigue of the brain. With the use of a half-transparent mirror array 20 as proposed by the present invention, it is possible to arbitrarily position the video cameras $3_1$ and $3_2$ and set their optical axes $Ox_1$ and $Ox_2$, permitting image capturing at an appropriate angle of parallax δ and hence overcoming the above-noted defect. This makes it possible to offer a display and image capture apparatus which enables eye contact and provides a display full of a sense of reality.

By using a lenticular sheet in the 3D display 1' and coating a half-transparent mirror on the surface of each lenticular lens it is possible to offer a smaller and less costly display and image capture apparatus for 3D display, because the lenticular sheet serves also as the half-transparent mirror array 20 depicted in FIG. 34.

In the embodiments described above, since the half-transparent mirror array formed as an array of micro HMs is disposed in front of the display 1, the brightness of the displayed image thereon is inevitably lowered. Such deterioration of the picture quality could be held down by a combination of a display of a specific structure and a half-transparent mirror array of a specific structure as described below.

Figure 35:
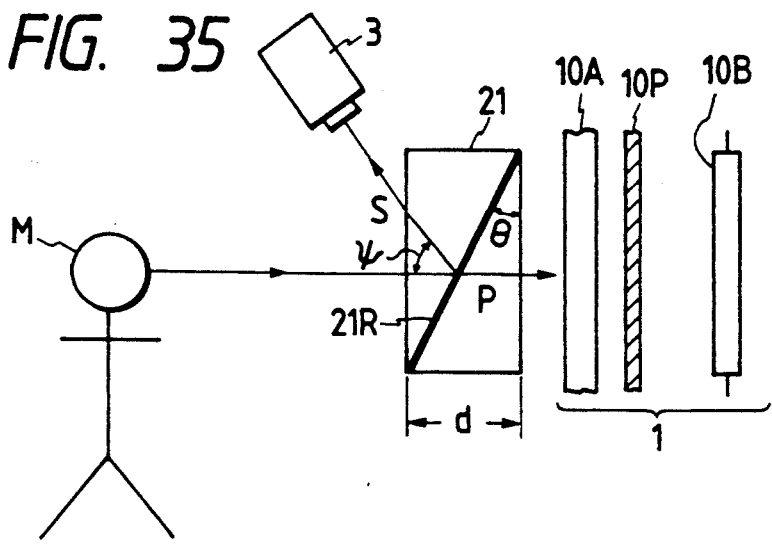
FIG. 35 is a side view for explaining the principle of operation in the case of using a polarizing beam splitter as the micro HM.

FIG. 35 is a schematic diagram for explaining the construction of one micro HM 21 of the half-transparent mirror array 20 for use in the display and image capture apparatus of the present invention and its principle of operation. The display 1 comprises the liquid crystal panel 10A, a polarizer 10P disposed behind it and the back light 10B. The micro HM 21 is formed by a polarizing beam splitter (hereinafter referred to as a PBS). In FIG. 35 the angle θ is the angle of inclination of the reflecting surface 21R in the PBS.

The reflecting surface 21R is formed by a dielectric multi-layer and light from the subject M standing in front of the PBS 21 is incident thereon but only S-polarized light is reflected by the reflection surface 21R. The reflected light image, captured by the video camera 3, is equivalent to an image captured at the position of the display 1. The PBS 21 permits the passage therethrough of only P-polarized light and hence functions as a polarizer and is used also as a polarizer for the liquid crystal display.

In the display and image capture apparatus which employs a liquid crystal display of the type having a polarizer formed on its front, the quantity of light transmitted therethrough is reduced by the polarizer down to about 30% and is further reduced by the half-transparent mirror down to around 50%, resulting in the brightness on the display surface being lowered. In the apparatus of FIG. 35, however, since the PBS 21 serves both as the half-transparent mirror and as the polarizer, it is possible to check a decrease in the quantity of light transmitted and hence prevent a decrease in the brightness on the display surface.

Figure 36:
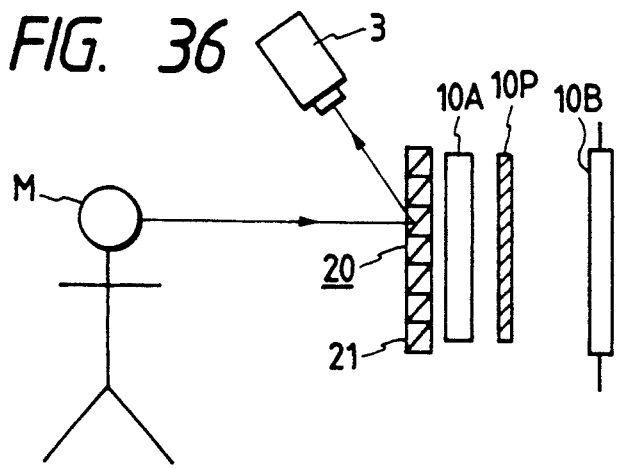
FIG. 36 is a side view illustrating the configuration of a display and image capture apparatus employing the half-transparent mirror array 20 formed by an array of micro beam splitters 21.

FIG. 36 schematically shows the general configuration of a display and image capture apparatus in which a plurality of such micro PBSs 21 as mentioned above are arranged in the same plane to form the half-transparent mirror array 20, which is used also as the polarizer of the liquid crystal display and is disposed in front of the liquid crystal 10A. The liquid crystal display 10A is irradiated by light from the back light 10B through the polarizer 10P placed behind the liquid crystal panel 10A. As compared with the configuration employing a CRT as the display 1, the configuration of this embodiment affords substantial reduction of the depth d, and hence permits miniaturization of the apparatus.

Figure 37:
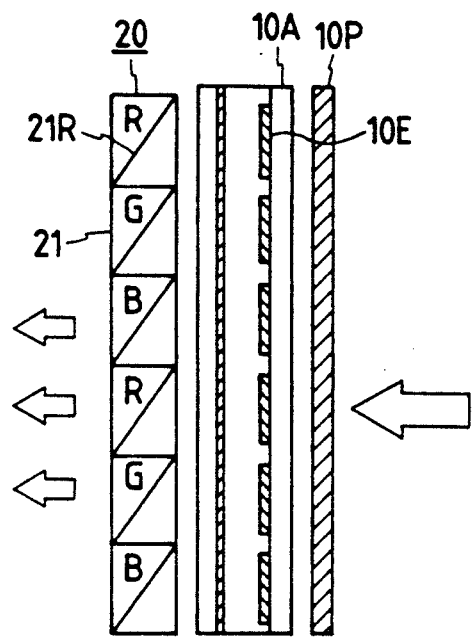
FIG. 37 is a sectional view illustrating the construction of a display panel in the case where the half-transparent mirror array 20 composed of the micro beam splitters is used both as a color filter and as a polarizer of a color liquid crystal display.

FIG. 37 illustrates in section the half-transparent mirror array 20 and the liquid crystal panel 10A of a display and image capture apparatus which utilizes the half-transparent mirror array 20 formed by arranging the micro PBSs 21 and a color liquid crystal display. Also in this case, the half-transparent mirror array 20 is used as a polarizer forming part of the liquid crystal display. The micro PBSs 21 each permit the passage therethrough of one of red light, green light and blue light.

An ordinary liquid crystal panel for color display decomposes white light, by color filters, into wavelengths corresponding to red light, green light and blue light and provides a color display by controlling the transmittivity of each light. In this instance, the dielectric multi-layer film coated over the reflecting surface 21R of the PBS transmits the P-polarized light but reflects the S-polarized light. By properly selecting the thickness and the refractive index of the multi-layer inductor film, the transmission and reflection of light can be made wavelength-dependent; namely, a desired interference color can be attained. In the liquid crystal display for use in the display and image capture apparatus of this embodiment micro PBSs 21, each of which permits the passage therethrough of only red light, green light or blue light, are disposed opposite pixel electrodes 10E each forming one pixel, and consequently, the micro PBSs 21 function both as the polarizer and as the color filter.

The configuration of this embodiment does not call for the use of a color filter, and hence substantially improves the brightness on the display surface.

Figure 38A:
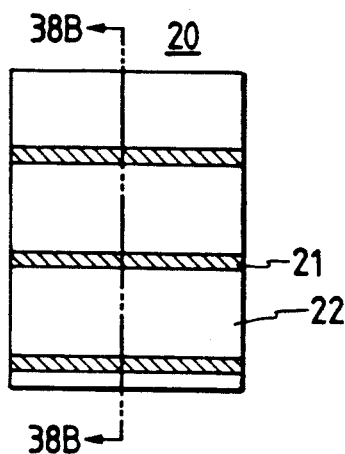
FIG. 38A is a front view of another half-transparent mirror array for use in the present invention.
Figure 38B:
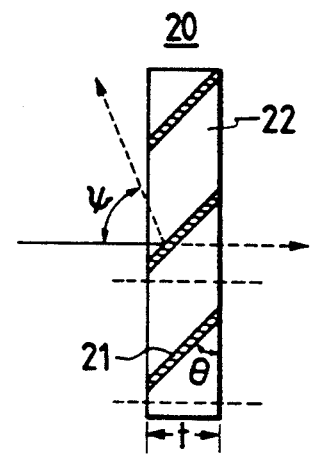
FIG. 38B is a sectional view taken on the line 38B—38B in FIG. 38A.

FIGS. 38A and 38B are a plan and a sectional view of another example of the half-transparent mirror array 20 for use in the display and image capture apparatus of the present invention. The micro HM films 21 and transparent films 22 are arranged alternately with each other at a certain angle $\theta$ to the surface of the array 20. A portion surrounded by the dotted line in FIG. 38B serves as a micro beam splitter and one portion of light incident on this optical element passes intact therethrough and the other remaining portion of the incident light is reflected in the direction of a certain angle $\psi$ shown in FIG. 38B.

Figure 39A:
FIGS. 39A through 39C are schematic diagrams for explaining first to third steps involved in the manufacture of the half-transparent mirror array depicted in FIGS. 38A and 38B.
Figure 39B:
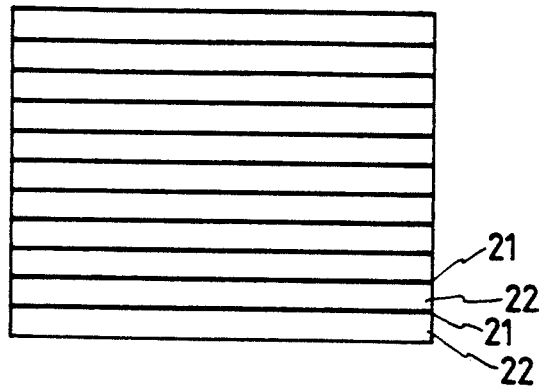
Figure 39C:
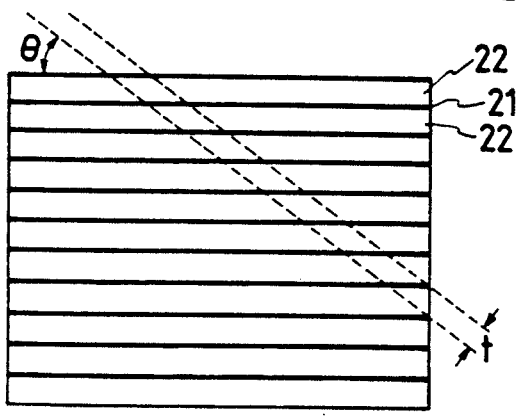

Next, a description will be given, with reference to FIGS. 39A through 39C, of a method for the fabrication of the half-transparent mirror array 20 shown in FIGS. 38A and 38B. The fabrication starts with making a number of half-transparent mirror sheets each formed by coating the micro HM film 21 on a transparent substrate 22 such as a highly flat sheet of glass, as shown in FIG. 39A, followed by laminating and bonding the half-transparent mirror sheets to form a laminated structure such as depicted in FIG. 39B. Next, the laminated structure thus obtained is cut at the angle $\theta$ to the surface thereof into a desired thickness t as shown in FIG. 39C and then the cut ends of the cut-out member are polished. Thus, the half-transparent mirror array 20 shown in FIGS. 38A and 38B is obtained.

While in the above a number of transparent substrates 22 each coated with the micro HM film 21 are laminated, it is also possible to fabricate the laminated structure shown in FIG. 38B, by depositing the micro HM films 21 and the transparent films 22 alternately with each other on the transparent substrate as of glass. The thicknesses of the respective layers of the laminated structure, the cutting angle $\theta$ and the thickness t are free from any specific limitations and can freely be chosen. The manufacturing method mentioned above is advantageous in that the flatness, size and inclination angle of the reflecting surface are highly accurate, since substrates of excellent flatness are used. Accordingly, the use of the half-transparent mirror array produced by such a method precludes the possibility of defocusing of a reflected image which is caused by scattering of the inclination angle of the reflecting surface or its poor flatness or unevenness, and hence ensures capturing an image of good quality by the video camera 3.

The micro HM film 21 may be formed of chromium, aluminum or similar metal, or an inductor. By using, as the HM film 21, a multi-layer film formed by dielectric materials of different refractive indexes, it is possible to obtain the function of a dichroic mirror or a polarizing beam splitter. In this instance, the half-transparent mirror array 20 serves as a half-transparent mirror having a function of controlling the transmission and reflection of incident light according to its state of polarization (i.e. functions as a polarizing beam splitter PBS) and reflects only S-polarized light of the light from the subject standing in front of the PBS. The reflected light image captured by the video camera 3 is equivalent to an image captured from the position of the display 1. Further, the PBS permits the passage therethrough of only the P-polarized light, and hence possesses the function of a kind of polarizer.

As described above, the apparatus of the present invention has a construction in which the half-transparent mirror array formed by micro HMs arranged in the same plane at a desired inclination angle is disposed opposite the display surface of the display and a reflected image from the half-transparent mirror array is captured by the video camera, and hence the depth of the apparatus is small.

Besides, since a reflected image from the micro HM film 21 is captured, the image is inverted laterally, but it is self-evident that this problem can be solved by the use of a display capable of displaying the image after inverting it again by electrical processing of the video signal, or by reflecting the reflected image again. Moreover, by turning the half-transparent mirror array 20 a desired angle in the same plane so that the micro HMs 21 are directed in a desired direction, the video camera 3 can be positioned below or above the display 1 or on the right or left thereof.

It is apparent that many modifications and variations may be effected without departing from the scope of the novel concepts of the present invention.

What is claimed is:

1. A display and image capture apparatus comprising:
   display means provided with a display surface for displaying an image;
   half-transparent mirror means disposed in front of said display surface substantially in parallel thereto, for reflecting a portion of light from a subject standing in front of said display surface and for transmitting therethrough a portion of light from said image on said display surface, said half-transparent mirror means including a plurality of micro half-transparent mirrors (micro HMs) having substantially identical shapes and arranged on a common plane, said micro HMs having reflecting faces at predetermined inclination angles $\theta$ relative to said common plane, respectively, for reflecting at least a portion of light from said subject; and
   image capturing means disposed near said display means, for receiving light reflected from said half-transparent mirror means and for capturing the image of said subject.

2. The apparatus of claim 1 wherein said inclination angles $\theta$ of said micro HMs are selected in the range of between 13 and 45 degrees.

3. The apparatus of claim 2 wherein said reflecting faces of said micro HMs are extended, in parallel to one another, along said common plane, each reflecting face having a width W in a direction perpendicular to a direction of extension of said micro HM, said micro HMs being spaced at least Wsinθ·tan2θ from one another.

4. The apparatus of claim 1 wherein said half-transparent mirror means has an antireflection layer formed on a side thereof opposing said display surface.

5. The apparatus of claim 1 wherein said half-transparent mirror means has a light dispersing layer formed on a side thereof opposing said display surface.

6. The apparatus of claim 1 wherein said half-transparent mirror means includes a transparent substrate, a plurality of projections formed integrally with said transparent substrate on one side thereof and each having a plurality of slopes, and said micro HMs each being formed on at least one of said slopes of said projection.

7. The apparatus of claim 6 wherein gaps between said projections formed on said transparent substrate are filled with transparent resin so that the surface of said half-transparent mirror means is substantially flat.

8. The apparatus of claim 1 wherein said half-transparent mirror means has a laminated structure formed by laminating transparent layers and half-transparent layers alternately with each other and having, as the front and back of said half-transparent mirror means, two parallel faces cut at said inclination angles to said transparent and half-transparent layers.

9. The apparatus of claim 8 wherein said half-transparent layers are metal layers.

10. The apparatus of claim 8 wherein said half-transparent layers are dielectric layers having a refractive index different from that of said transparent layers.

11. The apparatus of claim 8 wherein said half-transparent layers are each formed by a plurality of laminated dielectric layers of different refractive indexes.

12. The apparatus of claim 1 wherein the transparency of each of said micro HMs is 50% or less.

13. A display and image capture apparatus comprising:
   display means provided with a display surface for displaying an image;
   half-transparent mirror means disposed in front of said display surface substantially in parallel thereto, for reflecting a portion of light from a subject standing in front of said display surface and for transmitting therethrough a portion of light from said image on said display surface, said half-transparent mirror means including a plurality of micro half-transparent mirrors (micro HMs) having substantially identical shapes and arranged in a common plane, said micro HMs having reflecting faces at predetermined inclination angles θ relative to said common plane, respectively, for reflecting light from said subject while passing therebetween light from said image on said display surface; and
   image capturing means disposed near said display means, for receiving light reflected from said half-transparent mirror means and for capturing the image of said subject.

* * * * *